United States Patent [19]

Tamai et al.

[11] Patent Number: 5,056,369
[45] Date of Patent: Oct. 15, 1991

[54] CAPACITIVE DIFFERENTIAL PRESSURE DETECTOR

[75] Inventors: Mitsuru Tamai; Tadanori Yuhara; Kimihiro Nakamura; Kazuaki Kitamura; Toshiyuki Takano; Teizo Takahama; Mikihiko Matsuda; Shinichi Souma, all of Kanagawa, Japan

[73] Assignee: Fuji Electric Co., Ltd., Kanagawa, Japan

[21] Appl. No.: 507,843

[22] Filed: Apr. 12, 1990

[30] Foreign Application Priority Data

| Apr. 14, 1989 | [JP] | Japan | 1-94804 |
| Apr. 14, 1989 | [JP] | Japan | 1-94805 |
| Aug. 8, 1989 | [JP] | Japan | 1-205265 |
| Aug. 8, 1989 | [JP] | Japan | 1-205266 |
| Aug. 8, 1989 | [JP] | Japan | 1-205267 |

[51] Int. Cl.$^5$ .......................... G01L 7/08; G01L 9/12
[52] U.S. Cl. ...................... 73/718; 73/724; 361/283
[58] Field of Search .................. 73/718, 724; 361/283

[56] References Cited

U.S. PATENT DOCUMENTS

| 3,697,835 | 10/1972 | Satori | 73/718 |
| 4,358,814 | 11/1982 | Lee et al. | 361/283 |
| 4,581,676 | 4/1986 | Baxter et al. | 73/718 |
| 4,903,532 | 2/1990 | Tamai et al. | 73/718 |
| 4,905,575 | 3/1990 | Knecht et al. | 73/718 |

FOREIGN PATENT DOCUMENTS

| 059488 | 9/1982 | European Pat. Off. . |
| 065845 | 12/1982 | European Pat. Off. . |
| 157599 | 10/1985 | European Pat. Off. . |

Primary Examiner—Donald O. Woodiel
Attorney, Agent, or Firm—Finnegan, Henderson, Farabow, Garrett and Dunner

[57] ABSTRACT

The present invention is directed to a capacitive differential pressure detector comprising a diaphragm disposed between two electrodes. In a first embodiment, each of the electrodes comprises two conductive plates with an insulator disposed therebetween. Step-like portions are formed in the conductive plate nearest the diaphragm. In a second embodiment, the plate nearest the diaphragm is insulative with a conductive film formed thereon. In a third embodiment, at least one groove is formed in the plate nearest the diaphragm. The groove is formed in a surface of the plate which faces the diaphragm. The groove also intersects a pressure guide hole. In a fourth embodiment, a substrate is disposed on a surface of the plate farthest from said diaphragm. In a fifth embodiment, an insulating layer has the same coefficient of thermal expansion as the conductive plates. In a sixth embodiment, the diaphragm is etched in order to form a circular flexible part, a centrally disposed displacing part, and a bonding part.

17 Claims, 13 Drawing Sheets

CAPACITIVE DIFFERENTIAL PRESSURE DETECTOR

FIELD OF THE INVENTION

The present invention relates to a capacitive differential pressure detector. In particular, the capacitive differential pressure detector of the present invention may be adapted as a gauge pressure detector if one of the applied pressures is atmospheric pressure. The capacitive differential detector of the present invention may also be adapted as an absolute pressure detector if one of the introduced pressures is a vacuum.

DESCRIPTION OF THE RELATED ART

FIG. 6 is a cross sectional view showing a structure of a conventional capacitive differential pressure detector. As shown, fixed electrodes 15 and 20 are respectively mounted to both sides of a diaphragm 10. The fixed electrode 15 is made up of a first conductive plate 12 disposed confronting the diaphragm 10, an insulating plate 13 coupled with the first conductive plate 12, and a second conductive plate 14 coupled with the insulating plate 13. The first and second conductive plates 12 and 14 are electrically interconnected by a conductive film 27 layered over the inner surface of a pressure guide hole 25. Pressure guide hole 25 also acts as a through hole.

The fixed electrode 15 is provided with a ring-like or annular support 21 which is coupled with the insulating plate 13 and disposed around a ring-like groove 23 surrounding the first conductive plate 12. The support 21 is coupled with the diaphragm 10 at a glass bonding portion 11 of predetermined thickness. The first conductive plate 12 and the support 21 are electrically insulated from each other. The support member 21 may be made of either insulating material or conductive material. The pressure guide hole 25, which is formed passing through the fixed electrode 15, introduces pressure P1 into a gap 29, which exists between the fixed electrode and the diaphragm 10.

A structure of the fixed electrode 20 resembles the structure of the fixed electrode 15 as mentioned above. Hence, only necessary portions of it will be referred to. A pressure guide hole 26, which is formed passing through the fixed electrode 20, introduces pressure P2 into a gap 30, which exists between the fixed electrode and the diaphragm 10.

The diaphragm 10 and the fixed electrode 15 cooperate to form a first capacitor whose capacitance Ca is taken out through lead pins A and C. Similarly, the diaphragm 10 and the fixed electrode 20 cooperate to form a second capacitor whose capacitance Cb is taken out through lead pins B and C.

When the pressures P1 and P2 are differentially applied to the diaphragm 10, the diaphragm displaces in accordance with a differential pressure. The capacitances Ca and Cb vary depending on a displacement of the diaphragm. The differential pressure can be measured on the basis of the variations of the capacitances.

The pressure detector shown in FIG. 6 is accommodated within a housing sealed by two sealing diaphragms (not shown), which respectively receive the pressures P1 and P2. The housing is filled with a noncompressive fluid, e.g., silicon oil, through which pressure transfers. Under this condition, the gaps 29 and 30, and the pressure guide holes 25 and 26 are filled with silicon oil.

FIG. 25 is a cross sectional view of a key portion of another conventional capacitive differential pressure detector.

FIG. 26 is an equivalent circuit containing capacitors in the differential pressure detector of FIG. 25. In FIG. 25, reference symbols 100A designates a diaphragm made of silicon, 2A and 3A represent fixed electrodes, which are respectively coupled with the diaphragm 100A by means of glass bonding portions parts interposed therebetween. Reference symbol 8A stands for a gap between the diaphragm 100A and the fixed electrode 2A, and 9A, a gap between the diaphragm 100A and the fixed electrode 3A. 6A denotes a through-hole formed in the fixed electrode 2A for introducing pressure P1 into the gap 8A. 7A denotes a through-hole formed in the fixed electrode 3A for introducing pressure P2 into the gap 9A.

The diaphragm 100A and the fixed electrode 2A cooperate to form a first capacitor whose capacitance Ca is pulled out through lead pins A and C. The diaphragm 100A and the fixed electrode 3A cooperate to form a second capacitor whose capacitance Cb is pulled out through lead pins B and C. In FIG. 26, reference symbols Csa and Csb represent respectively capacitors at the glass bonding portions 4A and 5A whose capacitances are constant.

When the pressures P1 and P2 are differentially applied to the diaphragm, the diaphragm displaces in accordance with a differential pressure. The capacitances Ca and Cb vary depending on a displacement of the diaphragm. The differential pressure can be measured on the basis of the variations of the capacitances.

The pressure detector shown in FIG. 25 is accommodated within a housing sealed by two sealing diaphragms (not shown), which respectively receive the pressures P1 and P2. The housing is filled with a noncompressive fluid, e.g., silicon oil, through which pressure transfers. Under this condition, the gaps 8A and 9A, and the pressure guide holes 6A and 7A are filled with silicon oil.

FIG. 7 illustrates a structural model of the capacitors formed between the diaphragm 10 and the fixed electrode 20 of the conventional capacitive differential pressure detector shown in FIG. 6. As seen from FIG. 7, a total of four capacitors are formed between the diaphragm 10 and the fixed electrode 20. A structure of the diaphragm 10, the gap 30, and the first conductive plate 17 forms a capacitor. A capacitance of the capacitor is denoted as Cb. A structure of the support 22, the insulating plate 18, and the second conductive plate 19 forms another capacitor. A capacitance of the capacitor is denoted as Csb. A structure of the diaphragm 10, ring-like groove 24, insulating plate 18, and the second conductive plate 19 forms a couple of capacitors. Capacitances of the capacitors are denoted as Csb1 and Csb2. The capacitance Csb1 depends on a dielectric constant of the gap 24. The capacitance Csb2 depends on a dielectric constant of the insulating plate 18. The diaphragm 10 and the support 22 are electrically connected by means of a conductor 33, which is used for capacitance take-out purposes. Accordingly, a structure containing the diaphragm 10, the glass bonding portion 16, and the support 22 forms no capacitor.

As already stated, the structure of the fixed electrode 15 resembles that of the fixed electrode 20, and those electrodes are disposed in a mirror-image fashion. The structural model of the capacitances as mentioned above is correspondingly applied to the fixed electrode 15. Capacitances formed in connection with the electrode 15, which respectively correspond to those in connection with the electrode 20, are designated by the same symbols whose subscripts are modified such that "b" is replaced by "a". That is, Ca, Csa, Csa1, and Csa2 are used. The capacitances in the pressure sensor shown in FIG. 6 may be equivalently connected as shown in FIG. 8(a). A, B and C denote lead pins. A total capacitance C1 existing between the lead pins A and C, and a total capacitance C2 between the lead pins B and C are expressed by $$C1 = Ca + Csa + Csa1 \cdot Csa2/(Csa1 + Csa2) \quad (1)$$

$$C2 = Cb + Csb + Csb1 \cdot Csb2/(Csb1 + Csb2) \quad (2)$$

Let us consider the equation (2). Assuming that in FIG. 6, an area of the first conductive plate 17 is Sb, a dielectric constant in the gap 30, Eb, and the width of the gap 30 is Tb, then the capacitance Cb is given by $$Cb = Eb \cdot Sb/Tb \quad (3)$$

Assuming that an area of the support 22 is Ssb, a dielectric constant of the insulating member 18 is Esb, and the thickness of the member 18 is Esb, and the thickness of the member 18 is Tsb, the capacitance Csb is $$Csb = Esb \cdot Ssb/Tsb \quad (4)$$

Assuming that an area of the ring-like groove 24 is Ssb1, and a depth of it is Tsb1, the capacitances Csb1 and Csb2 are $$Csb1 = Eb \cdot Ssb1/(Tsb1 + Tb) \quad (5)$$

$$Csb2 = Esb \cdot Ssb1/Tsb \quad (6)$$

Generally, a series capacitance of the capacitances Csb1 and Csb2 is negligible if those are set to be much smaller than the capacitances Cb and Csb, in design. The same thing is true for the fixed electrode 15. Under this condition, the circuit shown in FIG. 8(a) may be depicted as shown in FIG. 8(b). Further, the equations (1) and (2) may be rewritten into $$C1 = Ca + Csa \quad (7)$$

$$C2 = Cb + Csb \quad (8)$$

It is assumed that in FIG. 6, a differential pressure between the pressures P1 and P2 displaces the diaphragm 10 by "D" to the left. Under this condition, the capacitances Ca and Cb are expressed $$Ca = Ea \cdot Sa/(Ta - D) \quad (9)$$

$$Cb = Eb \cdot Sb/(Tb + D) \quad (10)$$

Since Ea and Eb are the dielectric constants of the gaps 29 and 30, let Ea=Eb=E. Ta and Tb are the widths of the gaps 29 and 30 when the diaphragm is in place, and hence let Ta=Tb=T. Then, rewriting the equations (9) and (10), we have $$Ca = E \cdot Sa/(T - D) \quad (11)$$

$$Cb = E \cdot Sb/(T + D) \quad (12)$$

Also as for the capacitances Csa and Csb, let Tsa=Tsb=Ts, and Esa=Esb=Es. Accordingly, the equations (7) and (8) may be rewritten into $$C1 = Ca + Csa = E \cdot Sa/(T - D) + Csa \quad (13)$$

$$C2 = Cb + Csb = E \cdot Sb/(T + D) + Csb \quad (14)$$

As well known, when the paired capacitances C1 and C2 differentially vary, the following formula provides a signal F varying in proportion to the displacement "D" of the diaphragm.

$$F = (C1 - C2)/C1 + C2) \quad (15)$$

If Ca=Cb, (Csa−Csb)/(Ca+Cb)<<1, following equation can be led from the equations (13), (14) and (15), $$F = D/T \propto (P_2 - P_1) \quad (16)$$

The equation shows that it is possible to obtain the signal F proportional to the displacement "D", or a differential pressure (P2−P1).

In a situation where the following conditions fail to hold; Ca=Cb, Ca>>Csb, the signal F is not proportional to the displacement "D" or the differential pressure (P2−P1).

In the case of FIG. 6 showing the conventional pressure sensor, the condition Ca=Cb does not always hold. The reason for this is that the first conductive plates 12 and 17 are mechanically shaped by supersonic wave machining or grinding, and therefore variations in tolerance (generally 50 to 100 um), splintering and chipping of the edge of the machined part, and the like are inevitably present. Consequently, the signal F will not be proportional to the differential pressure P (=P2−P1).

To maintain the proportionality of F to P, it is necessary to reduce the tolerance variation. This increases the machining cost. This is the first problem to be solved.

The second problem to be solved follows. Consider a case that in the structure shown in FIG. 6, an excessive pressure is introduced through one of the pressure guide holes, for example, the hole 25, into the differential pressure detector. In this case, upon receipt of the excessive pressure, the diaphragm 10 comes in contact with the fixed electrode 20 to limit a displacement of the diaphragm below the thickness of the glass bonding portion 16 which couples the diaphragm 10 with the fixed electrode 20. With the limitation of the displacement, the diaphragm 10 is protected from the applied excessive pressure. The mechanical machining is also used to form the pressure guide hole 26 in the central portion of the first conductive plate 17 of the fixed electrode 20. Accordingly, the edge of the machine portion would be possibly chipped or sharpened. When the electrode comes in contact with the diaphragm, the sharpened or chipped edge damages the diaphragm 10. Particularly when the diaphragm 10 is made of brittle material, such as silicon rubber, the diaphragm will be broken.

The third problem follows. As shown in FIG. 6, the diaphragm 10 is bonded to the support 21 by using glass or aluminum. When bonding them, the entire surface of the support 21, which faces the diaphragm 10, is coated with glass or aluminum, and the first conductive plate 12 is axially aligned with a movable effective diameter of the diaphragm 10 (diameter of an area of the diaphragm to be displaced in response to a pressure applied), i.e. the inner diameter of the glass bonding portion 11. Generally, the support 21 is formed by machining the first conductive plate 12 on the fixed electrode 15. The tolerance variation and splintering caused by machining inevitably causes a geometric error of the inner diameter of the support 21. Finally, this leads to a geometric error of the movable effective diameter of the diaphragm 10. Assuming that the variable effective diameter of the diaphragm 10 is "a", and the thickness of it is "h", a displacement "D" of the diaphragm due to the differential pressure (P2 P1) is $$D = K(a/2)^4 \cdot (1/h)^3 \tag{17}$$

where K is a constant of a material of the diaphragm 10, which is determined by using Young's modulus and Poisson's ratio. As seen from the equation 17), a machining error of the variable effective area "a" causes the displacement "D" to vary by a value approximately four times a ratio of the machining error "da" to the variable effective diameter "a". As already stated, the inner diameter "b" of the support 21 may be considered to be equal to the movable effective diameter "a" of the diaphragm 10. Accordingly, an error "da" of the movable effective diameter "a" is equal to a machining error "db" of the inner diameter of the support 21. This will be described using specific figures. Let us consider a case of $$a = b = 7 \text{ mm}$$

$$da = db = 0.2 \text{ mm}.$$

The machining error "db" is the ordinary machining error of 0.1 mm since the inner diameter of the support results from the machining. A ratio of the displacement "D1" containing the machining error to the displacement "D" not containing it is $$D1/D = \frac{K[(a + da)/2]^4 (1/h)3}{K (a/2)^4 (1/h)^3} = [(a + da)/a]^4$$
$$= [(b + db)/b]^4 = 1.11928$$

Accordingly, a relative error of the displacement "D" due to the machining error "db" of the inner diameter "b" of the support 21 is approximately 12%. This figure is about four times a relative error 2.86% of the inner diameter "b" of the support 21. Thus, a poor machining accuracy of the movable effective diameter causes an accuracy of the capacitive pressure sensor to vary. This is an undesirable matter.

The conventional pressure detectors as mentioned above have another problem of slow response. When an excessive pressure is suddenly removed, the displacement of the diaphragm cannot quickly follow the removal of the pressure. In other words, a response of the diaphragm displacement is poor.

FIG. 13 shows a sectional view of a key portion of the differential pressure detector of the prior art, when it is operating. As seen, a difference of the pressures introduced through the holes 25 and 26 (in the illustration, a pressure introduced through the hole 26 is much larger than that through the hole 25) bend the diaphragm 10 to the left, and the left side of the diaphragm is in contact with the right side of the conductive plate 12.

Under ideal conditions the contained liquid, such as silicon oil, is perfectly noncompressive and the surfaces of the diaphragm 10 and the conductive plate 12 are finished perfectly flat. When those surfaces come in contact with each other, no liquid will leak through the interface between them, the diaphragm 10 will further be bent after the central portion of the left side of the diaphragm is bent to close the right opening of the hole 25. Accordingly, a contact area of the diaphragm 10 with the conductive plate 12 is kept slightly larger than the right opening of the hole 25 even if the differential pressure increases.

FIG. 14 is a graphical representation of a variation of a contact area between the diaphragm and the fixed electrode vs. differential pressure. In the graph, the abscissa represents differential pressure P, and the ordinate a contact area S. As seen, in a region where the differential pressure is small, the contact area S is zero. At Pa of the differential pressure, the contact area is Sa slightly larger than the right opening of the hole 25. Under the ideal conditions as mentioned above, the contact area S is kept at Sa (see an alternate long and short dash line) even if the differential pressure P further increases. Actually, the ideal conditions are not present, and the contact area S increases as indicated by solid line with respect to increase of the differential pressure P from the pressure Pa.

Accordingly in a state that an excessive differential pressure acts on the diaphragm 10, it is considered that the diaphragm 10 and the conductive plate 12 contact with each other in a large area. When the excessive pressure is suddenly removed, the central portion of the diaphragm 10 displaces to the right, to break the sealing of the right opening of the pressure guide hole 25. Then, the pressure introduced through the hole 25 acts on the left side of the diaphragm 10, to facilitate the return action of the displacement of the diaphragm 10. Thus, in the conventional differential pressure detector, the return of the diaphragm 10 cannot quickly follow the abrupt decrease or removal of the excessive pressure. In other words, a response of the displacement of the diaphragm 10 is poor or slow.

The prior art pressure detectors described above have additional problems.

When the differential pressure (=P2−P1) is very large, the fixed electrode 15 is bent or displaced to the right. The capacitance between the diaphragm 10 and each of the fixed electrodes 15 and 20 varies depending on the displacement of the fixed electrode alone. This fact can be readily understood by replacing a detector 50 in FIG. 5 with prior art detector shown in FIG. 6. In FIG. 5, the fixed electrode designated by no reference symbol on the left side (corresponding to the fixed electrode 15 in FIG. 6) is subjected to a pressure P2 applied from the left side and a pressure P1 from the right side. The instance of FIG. 5 will subsequently be described in detail in connection with a first embodiment of the present invention.

In a state that a displacement "De" of the fixed electrode 15 due to the differential pressure, and the displacement of "D" as already mentioned concurrently occur, capacitances C1e and C2e between the diaphragm 10 and the fixed electrodes 15 and 20 are $$C1e = \epsilon A/(T - D - De) \tag{4c}$$

$$C2e = C2 = \epsilon A/(T+D) \quad (5c)$$

Exactly, the variations of the capacitances C1e and C2e are not differential. Accordingly, a differential pressure signal Fe, which is calculated by using the equation (15), is given by $$\begin{aligned} Fe &= (C1e - C2e)/(C1e + C2e) & (6c) \\ &= (2D + De)/(2D - De) & (6c) \end{aligned}$$

As seen from the equation (6c), when "De" is not negligible compared to "D", the differential pressure signal Fe is not proportional to the differential pressure (=P2−P1). In other words, the linearity of the signal Fe is lost.

Prior art capacitive differential pressure detectors, as will be described in detail below, have a drawback in that the span characteristic and the linearity of the detectors are adversely influenced by variation of an ambient temperature. In other words, the temperature characteristic of the detector degrades. Here, the span characteristic is a variation span of the capacitance relative to the 100% variation span of a differential pressure, that is, the characteristic variation of a displacement of the diaphragm.

Each electrode can be considered as a kind of bimetal formed by laminating plate-like members of different expansion coefficients. The electrodes have a three-layered structure consisting of the first and second conductive plates made of silicon and the insulating plate made of cordierite, which is sandwiched by the first and second conductive plates. Each electrode deforms when ambient temperature changes, so that in the diaphragm made of silicon peripherally fastened, a stress is developed in the radial direction of the diaphragm. A displacement of the diaphragm due to the stress degrades the linearity of the differential pressure signal due to the original displacement of the diaphragm caused by the differential pressure.

The radial stress in the diaphragm due to the ambient temperature change and the displacement of the diaphragm due to the stress will be described in detail.

In FIG. 6 a composite thermal expansion coefficient $\alpha$ of the fixed electrodes 15 and 20 is $$\alpha = K1(A - K2/\beta)(\alpha 1 - \alpha 2) + \alpha 2 \quad (1d)$$

where:
$\alpha 1$ and $\alpha 2$ = thermal expansion coefficients of cordierite and silicon respectively.
E1 and E2 = Young's moduli of cordierite and silicon respectively,
H1 and H2 = thickness of the cordierite and silicon layers respectively, and
H3 = thickness of supports 21 and 22.

In the above equation, K1 and K2 are constants that are determined by E1, E2, H1, and H2. Further, A and B are $$A = (H1 + 2H3)/2, \text{ and } B = 1/(H1 \cdot E1).$$

If E1=8,000, E2=15,300 (kg/mm$^2$), $\alpha 1$=1.1 (10$^{-6}$/C°), $\alpha 2$=3.1 (10$^{-6}$/C°), H1=0.5 (mm), H2=1.5 (mm), and H3=1.5 (mm), then we have $\alpha$ =2.53×10$^{-6}$/C°.

Accordingly, when a change of the ambient temperature is DT, a radial stress "d" developed in the diaphragm is $$\sigma = E \cdot D\alpha \cdot DT/(1-\nu) \quad (2d)$$

where
E and $\nu$ are Young's modulus and Poisson's ratio respectively,
$D\alpha$ = difference between the thermal coefficients of the fixed electrode and the diaphragm.

A displacement W of the diaphragm containing a radial stress $\sigma$ developed therein when a differential pressure P is applied thereto, is $$W = P/[K + (4H/R^2)\sigma] \quad (3d)$$

where
H and R = thickness and radius of the diaphragm respectively, and
K = constant determined by E, $\sigma$, H and R.

As seen from the equation (3d), the displacement W is determined by the first factor involving material and size of the diaphragm, and a second factor involving the radial stress. The equation (3d) further teaches that to measure a minute differential pressure P, it is necessary to reduce the thickness H of the diaphragm, and that the stress $\sigma$ hinders the differential pressure measurement of good sensitivity.

FIG. 18 shows a graphical representation of a characteristic variation of a value W/G with respect to thermal stress $\sigma$. A measurement to collect the data plotted in the graph was conducted under water-gauge pressures of 0.1 m and 3.2 m. In the graph, a solid line indicates a variation of the W/G when the water-gauge pressure is 0.1 m, and a broken line, a variation of the W/G when the water-gauge pressure is 3.2 m. G indicates a gap width between the diaphragm and the fixed electrode when the differential pressure applied is zero.

Specifically, when the ambient temperature changes within a range of ±60° C. (120° C.), the equation (2d) shows that the thermal stress "d" changes by 0.62 kg/mm$^2$. Due to the change of the thermal stress, the W/G concerning the diaphragm displacement is approximately 82% for the 0.1 m water-gauge pressure, and approximately 6% for the 3.2 m water-gauge pressure.

As described above, in another prior differential pressure detector, the diaphragm is constructed with a planar plate, although not explicitly explained. The diaphragm structured has the following problems.

(1) When it is placed in a high differential pressure, an extremely high stress is developed in the inner edge of the bonding portion between the diaphragm and the support that are bonded by the peripheral glass bonding, to possibly destroy the bonding portion or diaphragm. Particularly, when the diaphragm is made of brittle material, such as silicon, the probability of destroying the diaphragm is very high.

(2) The movement of the diaphragm, particularly the central portion of it, when it receives a pressure, is not translational. Accordingly, a change of the capacitance due to the pressure change contains higher order terms. This fact makes it difficult to compensate for such terms, and consequently degrades an accuracy of the pressure detection.

(3) Attempts to reduce the size and weight of the pressure detector require reduction of the thickness of the diaphragm. This requirement makes it difficult to assemble the pressure detector. Particularly in the range of low pressure and low differential pressure, this problem is more pronounced.

SUMMARY OF THE INVENTION

In order to overcome the above problems of the prior art, a first object of the present invention is to provide a linear and accurate capacitive pressure detector whose diaphragm will not be damaged when an excessive pressure is applied thereto.

A second object to the present invention is to provide a capacitive differential pressure detector which is responsive to diaphragm displacement following an abrupt decrease of an excessive differential pressure.

A third object of the present invention is to provide a capacitive differential pressure detector which produces a differential pressure signal with good linearity even if the differential pressure is large.

A fourth object of the present invention is to provide a capacitive differential pressure detector with a good temperature characteristic. Specifically, a fourth object of the present invention is to provide a capacitive differential pressure detector which minimizes the adverse effects of temperature variation upon the span characteristic and the linearity of a differential signal.

A fifth object of the present invention is to provide an accurate capacitive differential pressure detector having a relatively low or nonexcessive stress in the peripheral edge of the diaphragm upon application of an excessive pressure. Furthermore, it is an object of the present invention to provide a capacitive differential pressure detector which is easy to manufacture.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the first object, there is provided a capacitive differential pressure detector according to the first embodiment. A capacitive differential pressure detector according to the present invention comprises: a diaphragm having opposite side surfaces; fixed electrodes disposed adjacent each of said opposite side surfaces of said diaphragm, each of said fixed electrodes including: a first plate adjacent a central portion of one of said opposite side surfaces of said diaphragm; an annular support bonded to a peripheral edge portion of said diaphragm and disposed separated from and around a peripheral end face of said first plate; an insulating plate bonded over a surface of said annular support and a surface of said first plate opposite a surface facing said diaphragm; a second plate bonded to said insulating plate on a surface on a surface opposite said first plate, said second plate electrically connected to said first plate; wherein a pressure guide hole passes through the central portions of said first and second plates and said insulating plate, and an edge portion of the opening of said pressure guide hole close to said diaphragm, an outer peripheral edge portion of said first plate closer to said diaphragm, and an inner peripheral edge portion of said support closer to said diaphragm are all formed to be stepped portions. The capacitive differential pressure detector according to a second embodiment of the present invention comprises:

a diaphragm having opposite side surfaces;

fixed electrodes disposed adjacent each of said opposite side surfaces of said diaphragm, each of said fixed electrodes including:
a pressure guide hole passing through the central portion thereof;
a stepped portion formed in an edge portion of an opening of said pressure guide hole closer to said diaphragm;
an annular center planar portion made of insulating material positioned radially outside and contiguous to said stepped portion and disposed in parallel with and close to the surface of said diaphragm;
an annular groove radially outside and contiguous to said center planar portion;
a conductive film formed on at least said center planar portion and serving also as a capacitor lead terminal; and
an annular support, made of insulating material, bonded to but electrically insulated from said diaphragm at a peripheral portion radially outside said annular groove.

To achieve the third object, there is provided a capacitive differential pressure detector according to a third embodiment. The capacitive differential pressure detector according to the third-embodiment comprises:

a diaphragm having opposite side surfaces;

fixed electrodes disposed adjacent each of said opposite side surfaces of said diaphragm, each of said fixed electrodes including:
a pressure guide hole passing through the central portion thereof;
wherein each of said fixed electrodes has at least one groove formed on a surface closer to said diaphragm, said at least one groove intersects said pressure guide hole.

With such an arrangement, a pressure introduced from the other of the fixed electrodes is also applied to the substrate and the outer surface of each of the fixed electrode.

To achieve the fourth object, there is provided a capacitive differential pressure detector according to the fourth embodiment. A capacitive differential pressure detector according to a fourth embodiment of the present invention measures a pressure on the basis of capacitances of capacitors formed between a diaphragm displaced in response to said pressure and each of first and second fixed electrodes with pressure guide holes disposed on both sides of said diaphragm. The capacitive differential pressure detector according to the fourth embodiment of the present invention comprises a substrate with a pressure guide hole spaced by a predetermined distance from said first fixed electrode but bonded at the peripheral edge portion to the outside surface of said first fixed electrodes, whereby a pressure introduced from the second fixed electrode is also applied to a surface of said substrate opposite said first fixed electrode. To achieve the fifth object, there is a capacitive differential pressure detector according to a fifth embodiment. The capacitive differential pressure detector according to a fifth embodiment of the present invention comprises:

a diaphragm having opposite side surfaces;

fixed electrodes disposed adjacent each of said opposite side surfaces of said diaphragm, each of said fixed electrodes comprising:
a first plate adjacent a central portion of one of said opposite side surfaces of said diaphragm, said first plate having a thermal expansion coefficient substantially equal to that of said diaphragm;

an annular support bonded to a peripheral edge portion of said diaphragm and disposed separated from and around a peripheral end face of said first plate;

an insulating plate bonded over a surface of said annular support and a surface of said first plate opposite a surface facing said diaphragm, said insulating plate having a thermal expansion coefficient substantially equal to that of said first conductive plate; and a second plate bonded to said insulating plate on a surface on a surface opposite said first plate, said second plate electrically connected to said first plate.

To achieve the sixth object, there is a capacitive differential pressure detector according to a fifth embodiment. The capacitive differential pressure detector according to a sixth embodiment of the present invention comprises: a diaphragm displaced in response to said pressure and each of first and second fixed electrodes with pressure guide holes disposed on both sides of said diaphragm, wherein said diaphragm includes a part located in the central portion, said part mainly displacing in response to said pressure, a bonding part located in the peripheral edge portion, said bonding part bonded to and electrically insulated from each said fixed electrode, and a annular flexible part whose width is ¼ to 1/5 of the diameter of said displacing part and thickness is ½ or less of that of said displacing part, said flexible part coupling said displacing part with said bonding part.

In the capacitive differential pressure detector according to the first embodiment, the stepped portion formed in the inner peripheral edge portion of the support closer to the diaphragm exactly determines the movable effective diameter. The stepped portions formed in the outer peripheral edge portion of the first conductive plate closer to the diaphragm and in the edge portion of the opening of the pressure guide hole closer to the diaphragm exactly determines the areas of the diaphragm and the first conductive plate, which face each other. Therefore, if an excessive pressure is applied and the diaphragm comes in contact with the first conductive plate, the diaphragm will not be damaged.

In the capacitive differential pressure detector according to the second embodiment, the stepped portion formed radially outside the central planar portion exactly determines the movable effective diameter of the diaphragm. The stepped portion radially outside the center planar portion and the stepped portion formed in the edge portion of the opening of the pressure guide hole closer to the diaphragm exactly determines the areas of the diaphragm and the fixed electrode, which face each other. Therefore, if an excessive pressure is applied and the diaphragm comes in contact with the first conductive plate, the diaphragm will not be damaged.

In the capacitive differential pressure detector according to the third embodiment, when an excessive pressure presses a part of one of the sides of the diaphragm against the surface of the fixed electrode, the pressure introduced through the fixed electrode is also applied to the surface of the diaphragm, through the groove intersection the pressure guide hole. The pressure applied to the diaphragm surface facilitates the return action of the displaced diaphragm, thereby improving the response of the diaphragm.

In the capacitive differential pressure detector according to the fourth embodiment, a differential pressure applied to both sides of the substrate displaces the substrate. However, the pressure applied to both sides of each fixed electrode are equal, so that it will not be displaced Accordingly, the capacitances of the capacitors formed by the diaphragm and the fixed electrodes vary in an exact differential manner.

In the capacitive differential pressure detector according to the fifth embodiment, the first and second conductive plates of the fixed electrodes disposed on both sides of the diaphragm, and the insulating plates interposed therebetween are made of the materials of equal or near thermal expansion coefficients. Accordingly, no radial stress is developed in the diaphragm when the ambient temperature varies. Accordingly, no displacement occurs due to this stress. Therefore, the span characteristic and the linearity of the differential signal are kept good even if ambient temperature varies.

In a sixth embodiment, with the ring-like flexible part, a stress generated in the inner peripheral edge portion of the bonding portion due to a pressure is lessened, and the displacing part when receiving a pressure displaces in the translation manner. There is no need for thinning of the original thickness of the diaphragm.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description serve to explain the principlesof the invention.

FIG. 8 shows an equivalent circuit concerning the capacitors of a prior art pressure detecting apparatus in which

DESCRIPTION OF THE PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

An embodiment of a capacitive differential pressure detector according to a first invention will be described with reference to the accompanying drawings.

Figure 1:
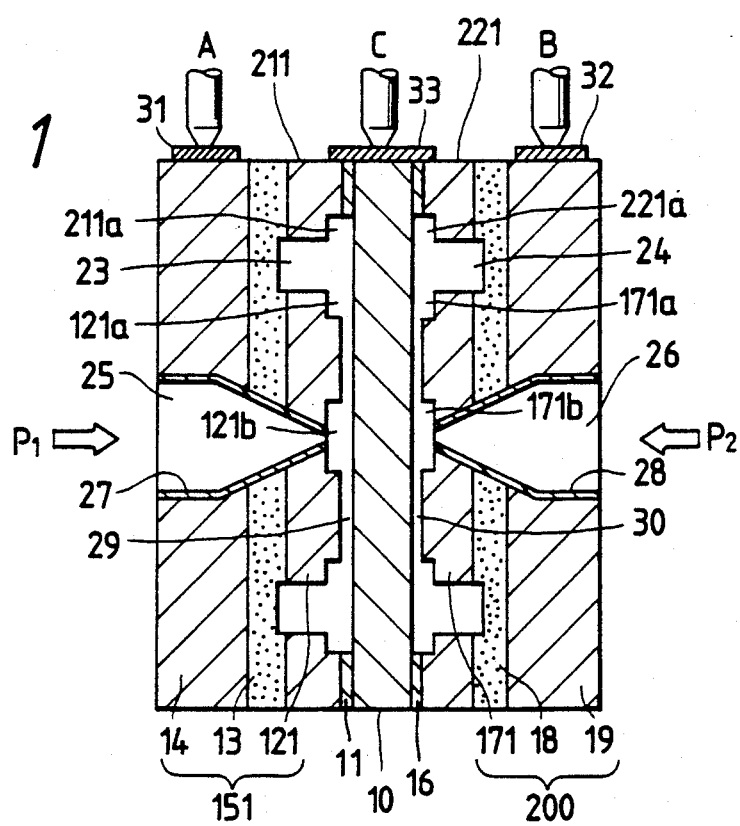
FIG. 1 is a cross sectional view of a first embodiment of the present invention.
Figure 6:
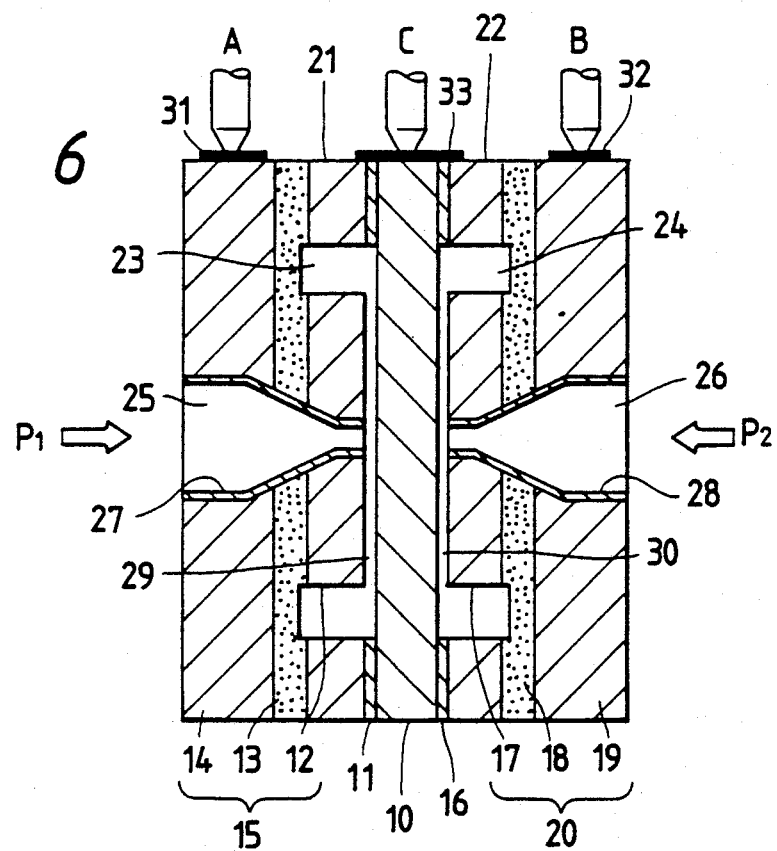
FIG. 6 is a cross sectional view of a prior art pressure detecting apparatus.

FIG. 1 is a sectional view showing the embodiment of a capacitive differential pressure detector whose basic arrangement is substantially equal to that of the prior art detector shown in FIG. 6. As shown in FIG. 1, conductive plates 121 and 171, and ring-like or annular supports 211 and 221 are representively provided on fixed electrodes 151 and 200, which are disposed on both sides of a diaphragm 10. The conductive plate 121 has a stepped portion 121a of given width and depth, which is formed in the peripheral edge of the surface of the conductive plate 121 closer to the diaphragm 10. A beveled portion 121b is formed in the edge portion of a pressure guide hole of the fixed electrode 151. Similarly, the conductive plate 171 has a stepped portion 171a and the pressure guide hole has a beveled portion 171b, which resemble the stepped portion 121a and the bevelled portion 121b of the conductive plate 121. The ring-like support 211 is disposed surrounding the conductive plate 121. The support 211 has a stepped portion 211a of given width and depth, which is formed in the peripheral inner edge facing the diaphragm 10 and the conductive plate 121. The ring-like support 211 is disposed surrounding the conductive plate 171. The support 221 has a stepped portion 221a of given width and depth, which is formed in the peripheral inner edge facing the diaphragm 10 and the conductive plate 171. The supports 211 and 221 may be made of either insulating material or conductive material.

The diaphragm 10 and the conductive plate 171 cooperate to form a first capacitor. The diaphragm 10 and the conductive plate 171 cooperate to form a second capacitor. The capacitances of these capacitors are measured through lead pins A and C, and B and C. When pressures P1 and P2 act on the diaphragm 10, the diaphragm displaces. A differential pressure applied is measured on the basis of the displacement of the diaphragm.

A method of manufacturing the fixed electrodes 151 and 200 will be described with reference to FIG. 3. The methods of manufacturing those electrodes are 151 and 200 substantially the same, and hence the method of manufacturing the electrode 151 alone will be described.

Figure 3A:
FIGS. 3(a) through 3(f) a sequence of process steps in manufacturing an embodiment of the present invention
Figure 3B:
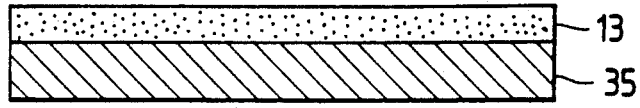
Figure 3C:
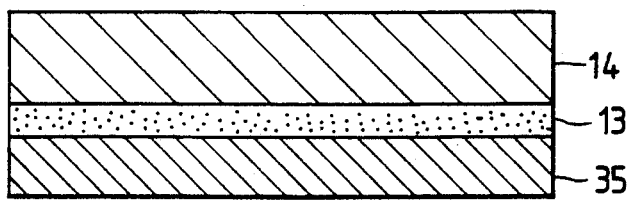

In FIG. 3, as shown in FIG. 3(a), a silicon conductive plate 35 rectangularly shaped is first prepared. Then, as shown in FIG. 3(b), a square shaped insulating plate 13 is bonded to and over the conductive plate 35 by baking glass powder. Afterwards, as shown in FIG. 3(c), a square shaped conductive plate 14 made of silicon is bonded to and over the insulating plate 13 by baking glass powder.

Figure 3D:
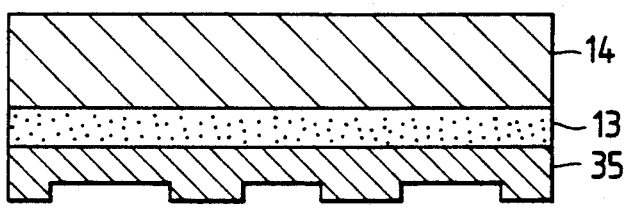
Figure 3E:
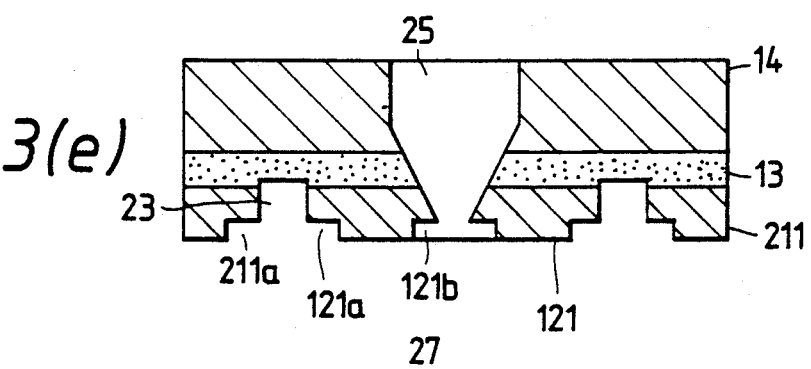
Figure 3F:
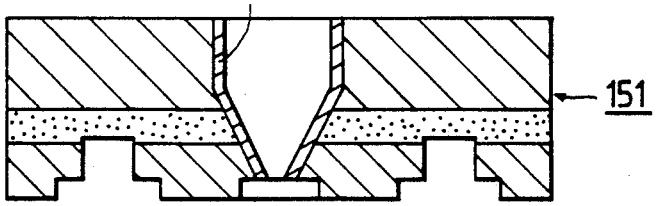

Subsequently, as shown in FIG. 3(d), metal such as gold or aluminum is deposited on other portions of the bottom surface of the conductive plate 35 than the portions to be used as the stepped portions, thereby forming a film of gold or aluminum which will serve as a corrosion preventing film in the process of etching. Then, the structure is subjected to etching process to etch the stepped portions up to a given depth. As shown in FIG. 3(e), a ring-like groove 23 is formed by supersonic machining. Since the groove 23 reaches the insulating plate 13, it partitions the conductive plate 35 into a conductive plate 121 and a support 211. Then, a pressure guide hole 25 is formed in the structure by supersonic machining, and as shown in FIG. 3(f), the inner surface of the hole 25 is coated with a conductive film 27, to complete a fixed electrode 151.

Figure 2:
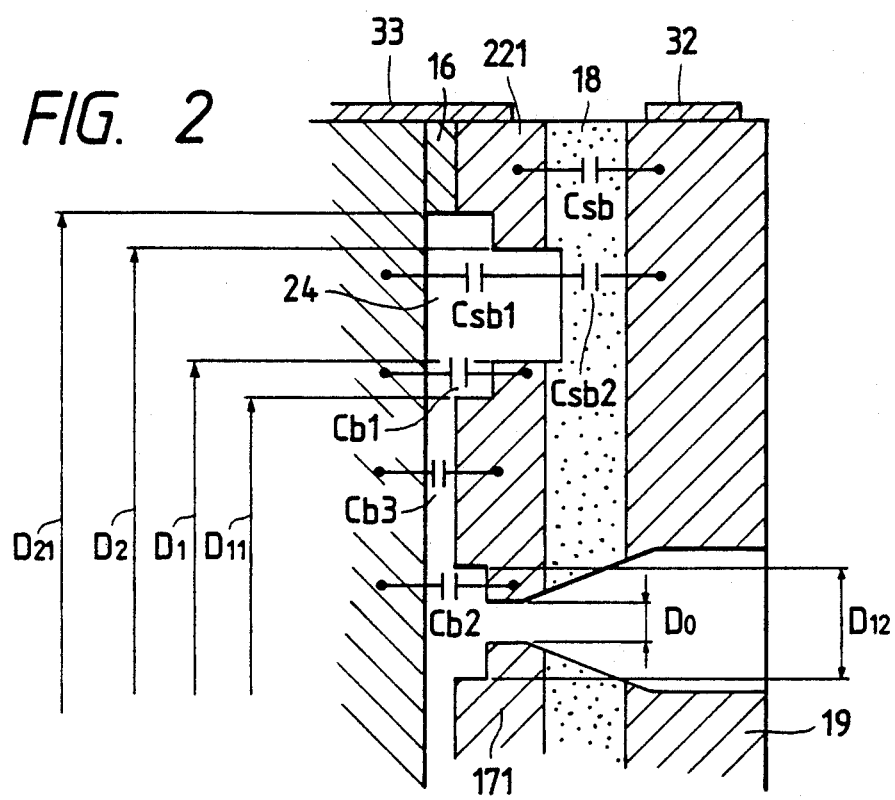
FIG. 2 shows a model diagram showing the structure forming capacitors of the embodiment.
Figure 7:
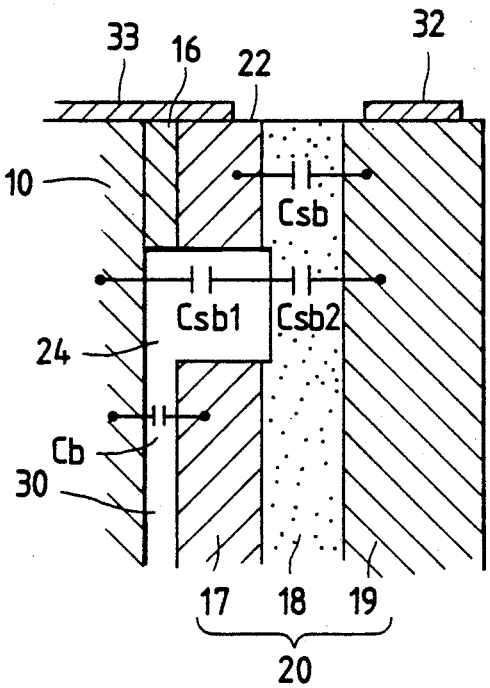
FIG. 7 shows a model diagram showing the structure forming capacitors of a prior art pressure detecting apparatus.
Figure 8A:
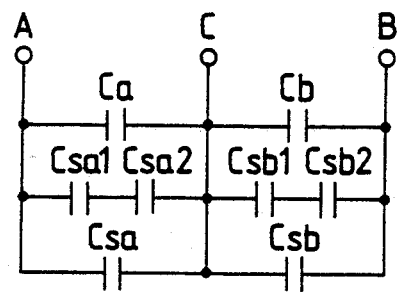
FIG. 8(a) shows an equivalent circuit before it is arranged, and FIG. 8(b), an equivalent circuit after it is arranged.
Figure 8B:
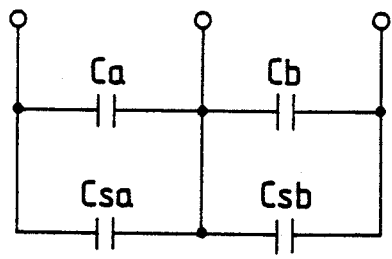

The capacitances in the embodiment of the capacitive pressure detector according to a first invention will be described. FIG. 2 shows a model illustration of the capacitances formed in the present embodiment. As seen from the figure, five capacitors are formed between the diaphragm 10 and the fixed electrode 200. In connection with those capacitors formed, the present capacitive pressure detector is the same as the prior detector except that a capacitance Cbb formed by the diaphragm 10 and the conductive plate 171, which corresponds to the capacitor Cb in FIG. 7, consists of a capacitance Cb1 between the stepped portion 171a (see FIG. 1) and the diaphragm 10, a capacitance Cb3 formed by the diaphragm 10 and the conductive plate 171, and a gap 30 interposed therebetween, and a capacitance Cb2 between the stepped portion 171b and the diaphragm 10.

The same thing is true for a capacitance Caa formed by the diaphragm 10 and the conductive plate 121. The capacitances Caa and Cbb are mathematically expressed $$Caa = Ca1 + Ca2 + Ca3 \tag{18}$$

$$Cbb = Cb1 + Cb2 + Cb3 \tag{19}$$

It is assumed that an area of the stepped portion 171a of the peripheral edge of the conductive plate 171 is Sb1 and its depth is Tb1, the area of beveled portion 171b of the peripheral edge of the hole 26 is Sb2 and its depth is Tb2, and the area of the conductive plate 171 is Sb3 and the width of the gap 30 is Tb. It is also assumed that the dielectric constant of the material between the diaphragm 10 and the conductive plate 171 is Eb. Then, the capacitances Cb1, Cb2, and Cb3 are $$Cb1 = Eb \cdot Sb1/(Tb + Tb1) \tag{20}$$

$$Cb2 = Eb \cdot Sb2/(Tb + Tb2) \tag{21}$$

$$Cb3 = Eb \cdot Sb3/Tb \tag{22}$$

From the equations (19), and (20) to (22), we obtain $$Cbb = [Eb \cdot Sb1/(Tb + Tb1)] + [Eb \cdot Sb2/(Tb + Tb2)] + (Eb \cdot Sb3/Tb) \tag{23}$$

Where, as shown in FIG. 2, the outer diameter of the conductive plate 171 is D1, the diameter of the plate exclusive of the stepped portion in the peripheral edge is D11, the diameter of the beveled portion of the pressure guide hole 26 is D12, and the diameter of the hole 26 is D0, the diameters D1 and D0 inevitably contain machining errors (50 to 100 um) when the ring-like groove 24 and the pressure guide hole 26 are formed by the supersonic machining. The diameters D11 and D12 are delineated by the photo etching or etching process as usually employed in the semiconductor industry, for example. Therefore, its machining error may be limited to within one to several microns.

Let the machining error be "e", $$Sb1 = \pi(D1^2 - D11^2)/4 \tag{24}$$

$$Sb2 = \pi(D12^2 - D0^2)/4 \tag{25}$$

$$Sb3 = \pi(D11^2 - D12^2)/4 \tag{26}$$

where $(D1-D11) > 2e$, and $(D12-D0) > 2e$. As described above, the areas Sb1 and Sb2 are not fixed because the diameters D11 and D12 contain the machining errors. The capacitance Cb3 is substantially fixed when compared to the areas Sb1 and Sb2, because a method is employed to make the diameters D11 and D12 free from the machining. To remove the influence by the capacitances Cb1 and Cb2, viz., by the areas Sb1 and Sb2 variable by the machining, the equation (23 teaches that the depths of Tb1 an Tb2 of the stepped portions are selected to be much larger than the gap width Tb. If the depths Tb1 and Tb2 are selected to be 10 times the gap width Tb, the influence by the areas Sb1 and Sb2 is approximately 1/11. Therefore, it is seen that the capacitances Cb1 and Cb2 varied by the machining error can be reduced much more than the capacitance Cb3. The same thing is true for the conductive plate 121.

Thus, with the conductive plates 121 and 171, it is possible to minimize the influence by the machining error when the fixed electrodes 151 and 200 are machined. Therefore, the capacitances can be formed by the diaphragm 10 and the conductive plates 121 and 171 so as to substantially satisfy Caa=Cbb. If that relation is satisfied, the characteristic indicated by the equation (16) can be obtained.

As seen from FIG. 1, the depth of each stepped portion can be larger than the chipping and sharpening that would be caused when the ring-like grooves 23 and 24 and the pressure guide holes 25 and 26 are formed. Therefore, if an excessive pressure is applied and the diaphragm 10 comes in contact with either of the conductive plates 121 and 171, the diaphragm 10 will never be damaged by the chipping and sharpening. Since the etching process is applied to form the stepped portions, chipping and sharpening would rarely be formed, rarely damaging the diaphragm 10.

As seen from FIG. 1, the areas where the supports 121 and 221 contact the diaphragm are determined by the process to form the stepped portions. The movable effective diameter of the diaphragm 10 may be determined by the diameter D21 (see FIG. 2) of the stepped portion, which is good in reproducibility and stable in size, if the depth of each stepped portion is larger than the glass bonding portions 11 and 16. Accordingly, in the resultant capacitive differential pressure detector, the displacement of the diaphragm 10 is stable, with good reproducibility.

The etching process, which is used for forming the stepped portions in the above-mentioned embodiment, may be replaced by polishing, for example, if required.

It is evident that the beveled portions in the structure of FIG. 1, which are shaped steplike or stepwise, may take any shape if it is concave.

Another embodiment of a capacitive differential pressure detector of the present invention will be described with reference to FIG. 4.

Figure 4:
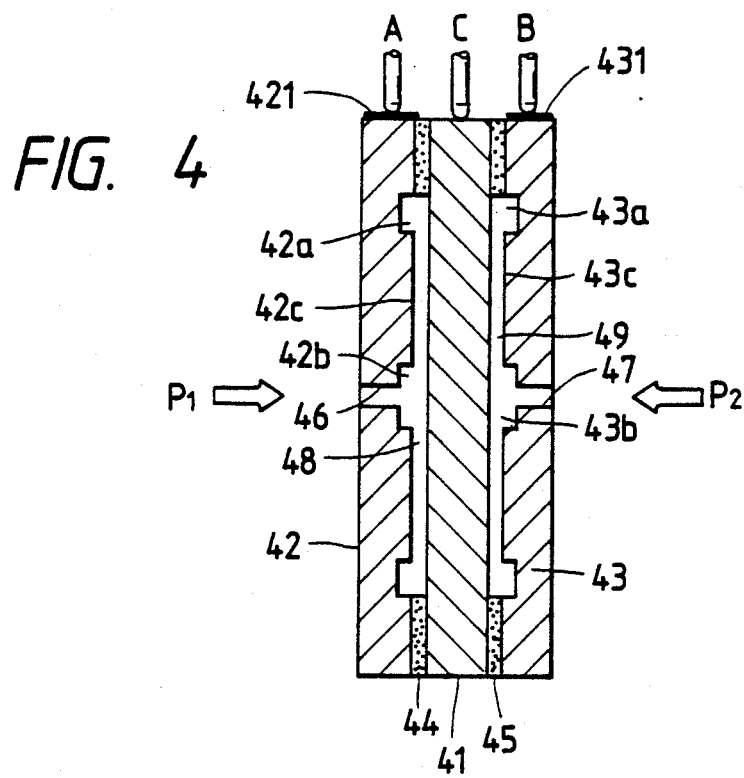
FIG. 4 is a cross sectional view of a second embodiment of the present invention.

In FIG. 4, insulating plates 42 as the fixed electrodes are bonded to the peripheral edge portions of both sides of a diaphragm 41 through glass bonding portions 44 and 45, respectively. Only the insulating plate 42 will be described, since the insulating plates 42 and 43 have the same structures.

As shown, a pressure guide hole 46 is formed passing through the central portion of the insulating plate 42. A planar part 42c is formed on the surface of the insulating plate 42, which faces the diaphragm 41. A ring-like groove 42a is disposed around the planar part 42c on the insulating plate 42. A portion of the insulating plate outside the ring-like groove 42a is a peripheral edge part of the insulating plate 42. A beveled part 42b shaped steplike or stepwise is formed in the opening edge portion of the pressure guide hole closer to the diaphragm 41. The shape of the beveled part 42b is not limited to the steplike or stepwise, but may be any shape if it is concave.

A conductive layer 421 is layered on the planar part 42c, the beveled part 42b, and a part of the ring-like groove 42a, is interlayered between the peripheral edge of the insulating plate 42 and the glass bonding portion 44, and is layered on the peripheral end face of the insulating plate 42. The conductive layer on the peripheral end face serves as a capacitance-lead contact coupled with a lead pin A.

In this instance, the beveled part 42b and the ring-like groove 42a are equivalent to the beveled portion 121b and those 121a and 211a in the embodiment of the first embodiment shown in FIG. 1. Accordingly, those have the beneficial effects comparable with those of the beveled portions of the first embodiment.

The insulating plate 43 is provided with a pressure guide hole 47, a beveled part 43b, a planar part 43c, a ring-like groove 43a, and a conductive layer 431, which correspond respectively to the pressure guide hole 46, beveled part 42b, planar part 42c, ring-like groove 42a, and the conductive layer 421 of the insulating plate 42. Gaps 48 and 49 are respectively present between one side of the diaphragm 41 and the planar part 42c, and between the other side and the planar part 43c. As in the first embodiment, a differential pressure (P1−P2) is measured on the basis of the capacitances between lead pins A and C, and B and C.

Figure 5:
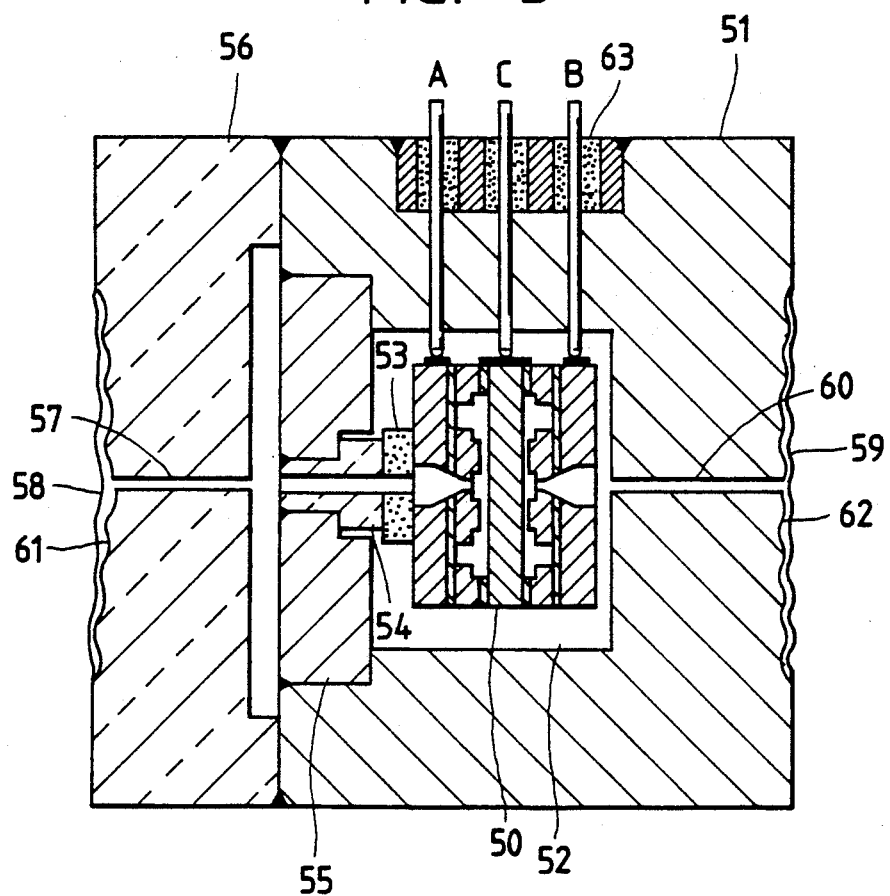
FIG. 5 is a cross sectional view of a pressure detecting apparatus incorporating the first embodiment.

FIG. 5 shows a cross sectional view of a differential pressure detecting apparatus of the first embodiment. In FIG. 5, reference numeral 50 designates the capacitive differential pressure detector shown in FIG. 1. The pressure detector 50 is housed in chamber 52 of a tubular member 51 with a bottom, and is coupled with a metal pipe 54 through an insulating member 53. The metal pipe 54 is welded to a mounting plate 55, which is further welded to an opening portion of the tubular member 51. A cap 56 is further welded to the opening portion of the tubular member 51. The cap 56 has a through hole 57. A seal diaphragm 58 is mounted on the cap 56. A pressure receiving chamber 61 is formed between the seal diaphragm and the surface of the cap. The bottom of the tubular member 51 has a through hole 60. A seal diaphragm 59 is mounted on the bottom, to form a pressure receiving chamber 62 therebetween. A hermetic seal terminal 63 with read pins A, B and C installed in one of the side walls of the tubular member 51.

A space existing between the seal diaphragms 58 and 59, which includes the chamber 52, through holes 57 and 60, and the pressure receiving chamber 61 and 62, is filled with silicon oil. Pressure exerted on each of the seal diaphragms 58 and 59 is transferred through the silicon oil to the diaphragm.

A third embodiment of a capacitive differential pressure detector according to the present invention will be described with reference to the accompanying drawings.

Figure 9:
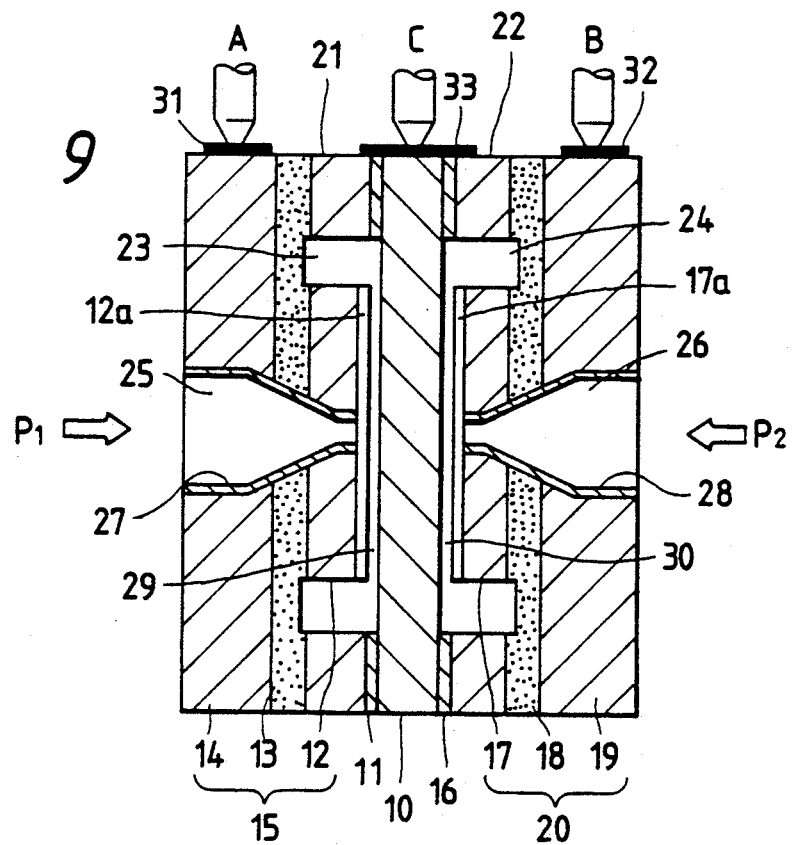
FIG. 9 is a cross sectional view of a third embodiment of the present invention.
Figure 10:
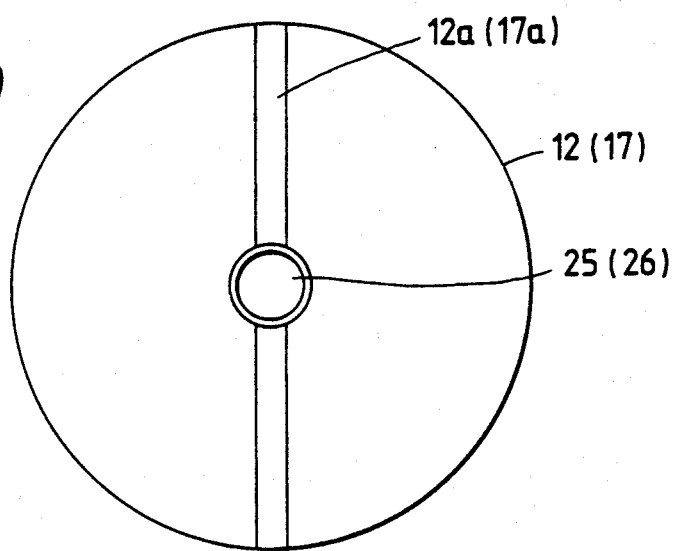
FIG. 10 shows a front view of a key member of the third embodiment.

FIG. 9 shows a cross sectional view of the embodiment, and FIG. 2 shows a front view of a key member of the embodiment. In FIGS. 9 and 10, the instant embodiment is different from the prior art shown in FIG. 6 in that grooves 12a and 17e are diametrically formed in the surfaces of the conductive plates 12 and 17, which face the diaphragm 10. The grooves 12a and 17e extend through the pressure guide holes 25 and 27. Like reference symbols are used to designate like or equivalent portions in FIG. 6.

Figure 12:
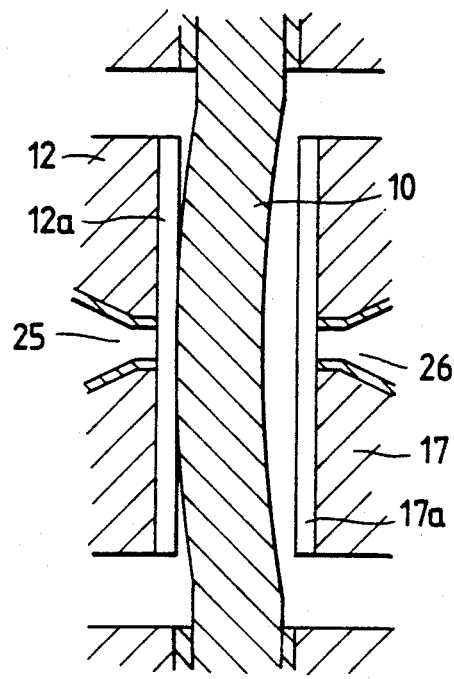
FIG. 12 shows a front view of a key member of the third embodiment of the present invention.
Figure 13:
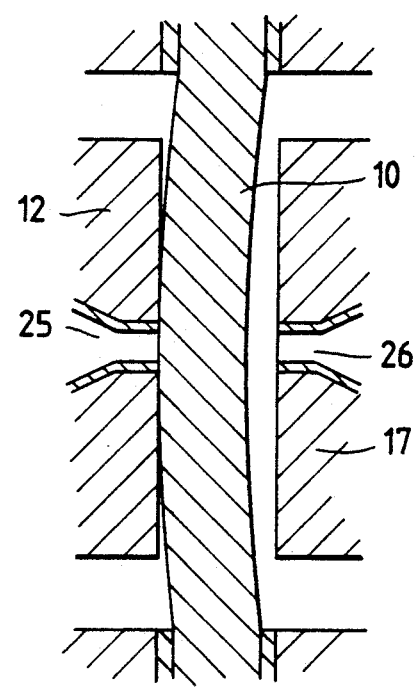
FIG. 13 shows a front view of a key position of a prior art pressure detecting apparatus which illustrates an operation of the prior art.
Figure 14:
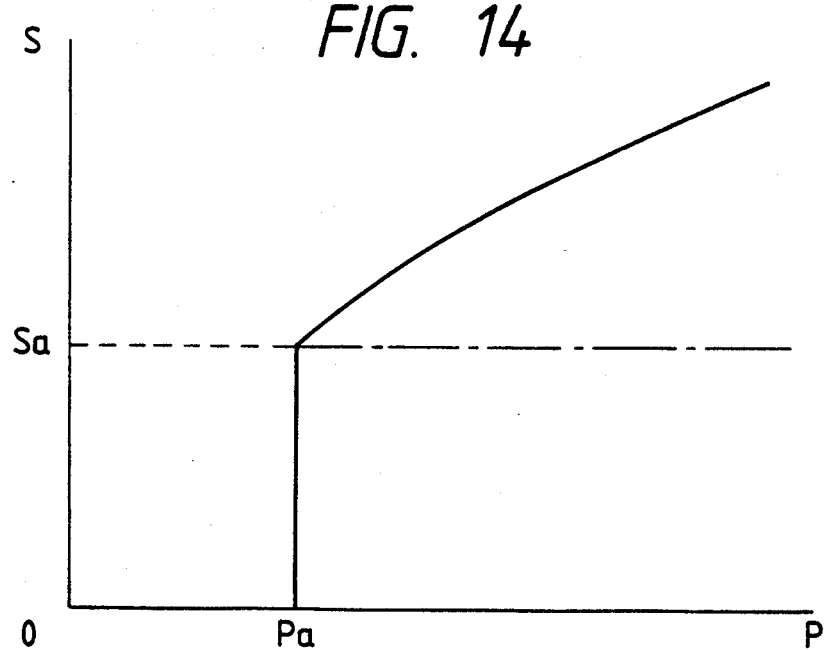
FIG. 14 is a graph showing a characteristic variation of a diaphragm-fixed electrode contact area of a prior art pressure detecting apparatus vs. a differential pressure.

An operation of the third embodiment will be described with reference to FIG. 12. In the figure, there is illustrated a cross section showing in detail a portion of the pressure detector where the diaphragm 10, when receiving an excessive differential pressure, displaces and comes in contact with the conductive plate 12, and its peripheral portion. In the figure, the center portion of the left side of the diaphragm 10 is pressed against and in contact with the right side of the conductive plate 12. It is noted that unlike the prior art of FIG. 13, a pressure guided by the hole 25 also exerts on the left side of the diaphragm 10 through the groove 12a. With the pressure acting on the left side of the diaphragm 10, when the excessive pressure is removed, the diaphragm 10 quickly returns to the original position. In other words, the diaphragm 10 returns with a good response.

To improve the return action or response of the displacement of the diaphragm 10, it is advantageous to widen the gap 12a as wide as possible. When the groove 12a is made wide, the surface area of the conductive plate 12 is proportionally reduced. Accordingly, the capacitance between the conductive plate 12 and diaphragm 10 reduces. To cope with this, compromise is made between the response of the diaphragm 10 in its displacement and the capacitance. The same thing is true for the conductive plate 17.

Figure 11:
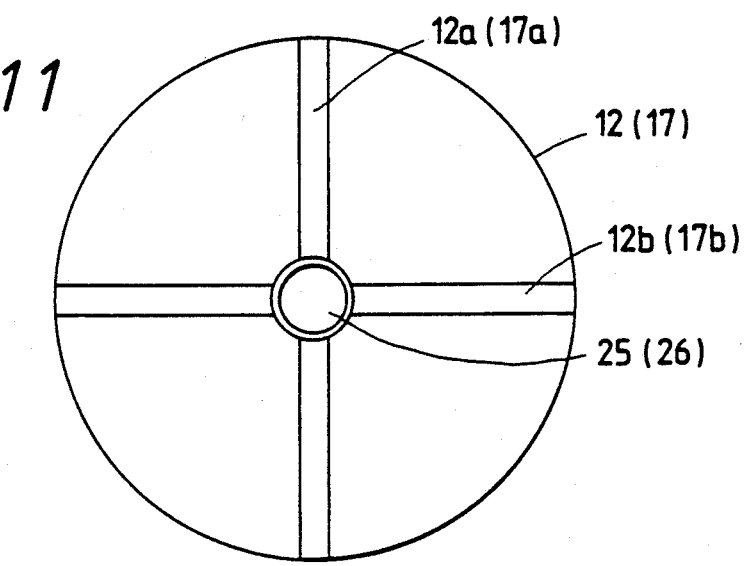
FIG. 11 shows a front view of a key member of the third embodiment.

FIG. 11 shows a front view of each of the conductive plates 12 and 17 of another embodiment. In this embodiment, grooves 12 and 12b, each of which are diametrically formed on the surface of the conductive plate, cross with each other. The pressure guide hole 25 is located at the intersection of the crossed grooves 12a and 12b. The grooves 17a and 17b, and the pressure guide hole 26 of the conductive plate 17 are similarly formed and arranged. With such structures, the guided pressure is applied to different locations on the diaphragm, so that the return action or response of the diaphragm 10 is superior to that of the previous embodiment. In this embodiment, the disadvantage of capacitance due to the crossed grooves exists. Practically, therefore, the compromise between the response and the capacitance is required in design.

An embodiment of a capacitive differential pressure detector according to a fourth embodiment will be described with reference to the accompanying drawings.

Figure 15:
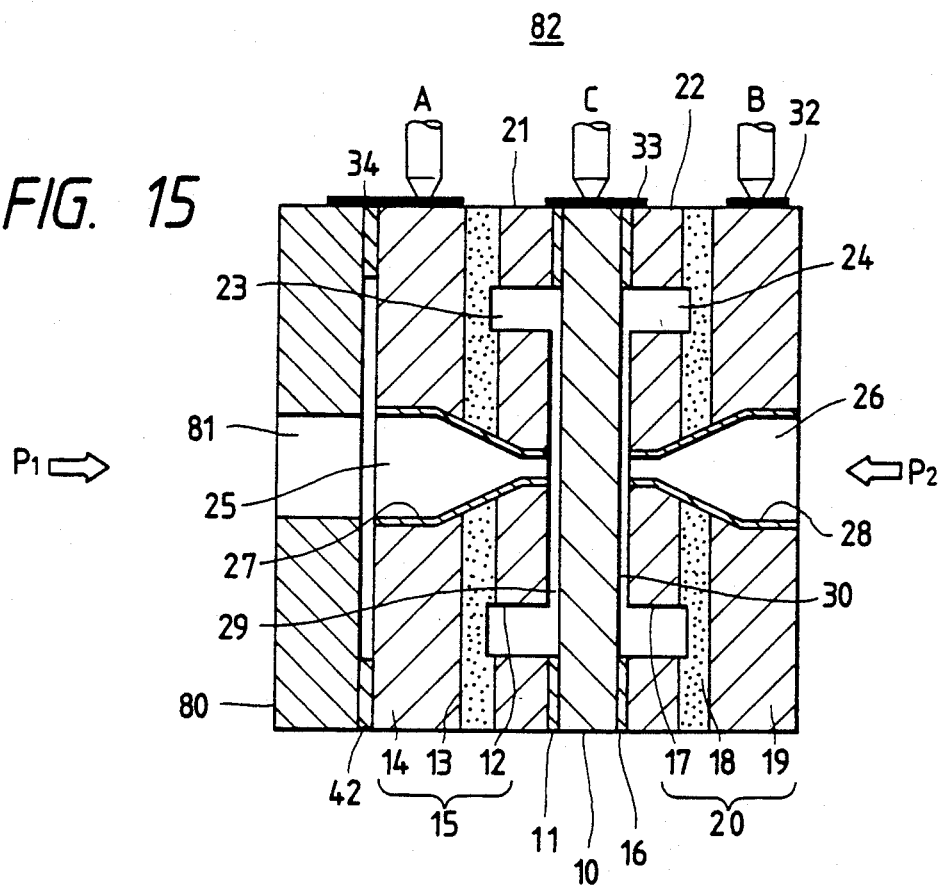
FIG. 15 is a cross sectional view of a fourth embodiment of the present invention.

FIG. 15 shows a cross sectional view of the embodiment. In the figure, the embodiment is different from the prior art of FIG. 6 in that a substrate 80 having a pressure guide hole 81 at the central portion is bonded to the peripheral edge portion of the left side of the conductive plate 14 contained in the fixed electrode 15 through a glass bonding portion 42, and that in place of the conductive layer 31, a conductive layer 34 is provided on the peripheral end faces of the conductive plate 14 and the substrate 80. In FIG. 1, like reference symbols are used to designate like or equivalent portions in FIG. 3.

The substrate 80 may be made of either insulating material or conductive material. In this instance, the same conductive material, e.g., silicon, as that of the conductive plate 14 is used because it is easy to manufacture and with the intention of suppressing the influence by temperature change. The glass bonding portion 42 may be made of Al - Si eutectic. The use of the conductive layer 34 places the substrate 80 and the conductive plate 14 at an equal potential.

Figure 16:
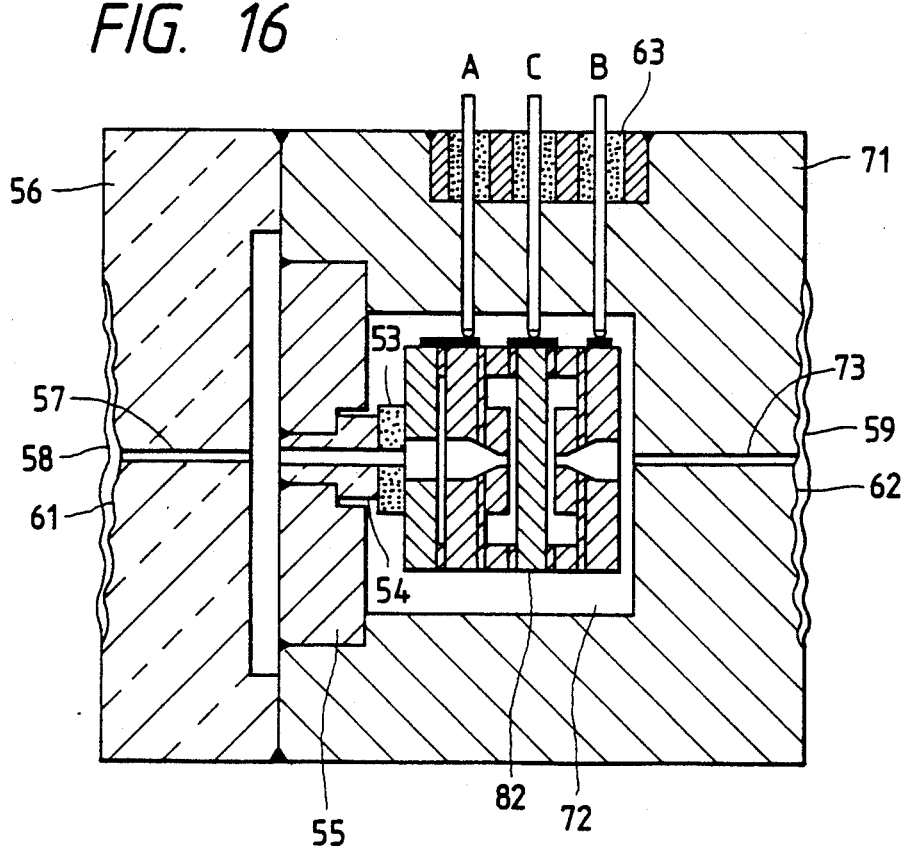
FIG. 16 is a cross sectional view of a pressure detecting apparatus incorporating the fourth embodiment of the present invention.

FIG. 16 shows a cross sectional view of a differential pressure detecting apparatus into which the above embodiment is assembled. In the figure, the present differential pressure detecting apparatus is different from the apparatus shown in FIG. 5 in that a tubular member 71 with a bottom is used in place of the tubular member 51 with a bottom, a chamber 72 replaces the insulating chamber 52, a through hole 73 replaces the through hole 60. The difference arises from the fact that the horizontal dimension of a capacitive differential pressure detector 82 is longer than the previous detector 50 by the length of the substrate 80.

An operation of the embodiment will be described with reference to mainly FIG. 15, and supplementally FIG. 16.

In FIG. 15, it is assumed that a pressure P2 applied from the right side is much higher than a pressure P1 from the left side. The pressure P2 also acts on the peripheral outer surface on the detector 82, as shown in FIG. 16. Accordingly, the pressure P2 acts on the left side of the substrate 80, while the pressure P1 acts on the right side. A difference between the applied pressures (=P2−P1) bends the substrate 80 to the right. On the other hand, the fixed electrodes 15 and 20 are not bent or displaced because the pressure P1 and P2 are equally applied to both sides of each of the fixed electrodes 15 and 20.

As a result, the capacitances formed by the diaphragm 10 and the fixed electrodes 15 and 20 exactly differentially vary. Accordingly, a differential pressure signal derived from the detector 82 exactly linearly varies in proportion to a variation of the differential pressure in accordance with the equation (15).

Figure 17:
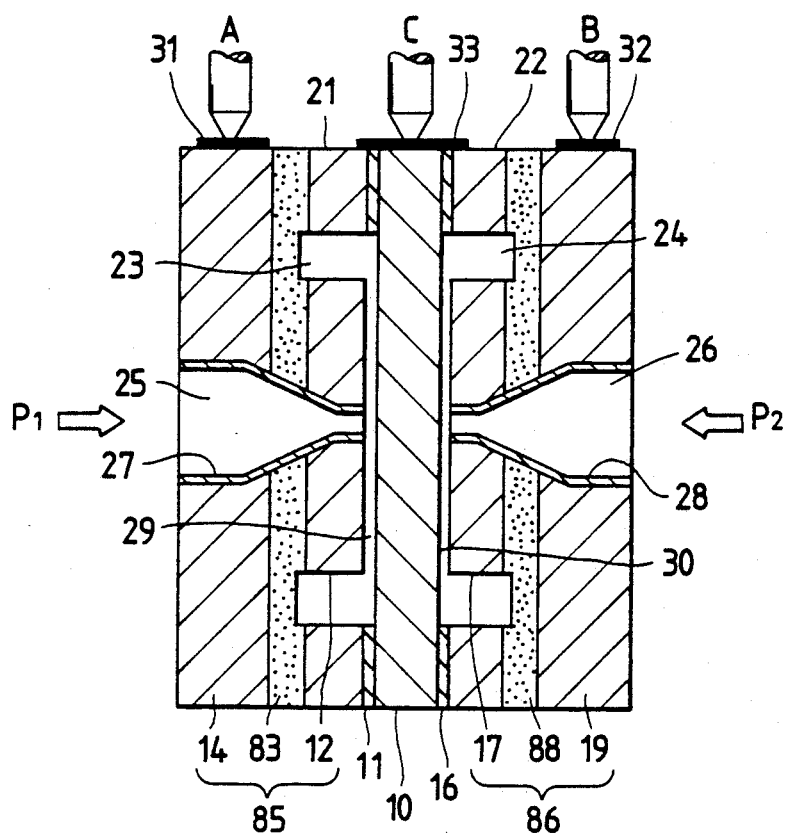
FIG. 17 is cross sectional view of a fifth embodiment of the present invention.
Figure 18:
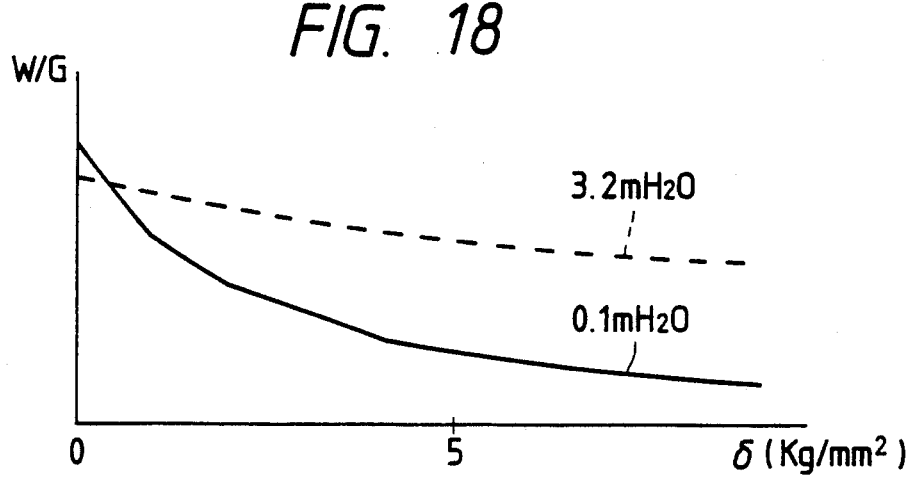
FIG. 18 is a graph showing a characteristic variation of a diaphragm displacement with respect to thermal stress.

A fifth embodiment will be described with references to the accompanying drawings. FIG. 17 shows a cross sectional view of the embodiment. In FIG. 17, insulating plates 83 and 88 contained in fixed electrodes 85 and 86 made of two types of ceramics of different thermal expansion coefficients which are mixed and baked. The resultant thermal coefficient is approximately equal to that of silicon. Other members are substantially the same as those already described, and hence like reference symbols are used to designate them. A mixing ratio of cordierite and mullite was variously changed. For those different mixing ratios, differential values between the thermal expansion coefficients of the mixed ceramics and that of silicon were collected, and plotted in a graph of FIG. 19. In the figure, the abscissa represents a percentage C of mullite (%), and the ordinate represents the difference $\beta$ between the thermal expansion coefficient of the mixed ceramics and that of silicon. As seen from FIG. 19, when the percentage C of the mullite exceeds 50%, the difference $\beta$ is below $\pm 10^{-6}/C°$.

By using the equation (1d), $\alpha = 2.71 \times 10^{-6}/C°$ is worked out. By using the equation (2d), $\alpha = 0.43$ kg/cm$^{-2}$ is worked out. By using those figures and the equation (3), W/G was worked out. At the 0.1 m of water-gauge pressure for measuring a minute differential pressure, it was 47% against 120° C. This figure is approximately half of 82% of the prior detector.

Figure 19:
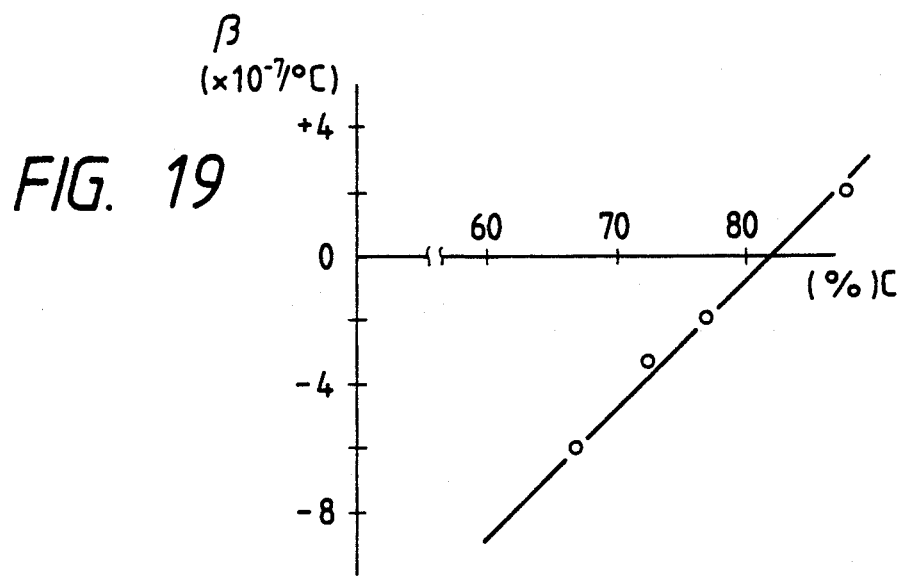
FIG. 19 is a graph showing a characteristic variation of thermal expansion coefficient of cordierite and mullite with respect to percentage of those materials.

In FIG. 19, when the percentage C of mullite is 80%, the thermal expansion coefficient $\beta$ is approximately zero. The influence by temperature variation is further suppressed compared with the previous case. Accordingly, the temperature characteristic is improved.

Figure 20:
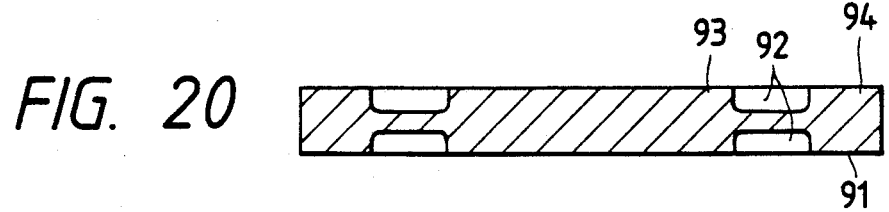
FIG. 20 is a cross sectional view of a key member commonly used in respective aspects of a sixth embodiment of the present invention.
Figure 21:
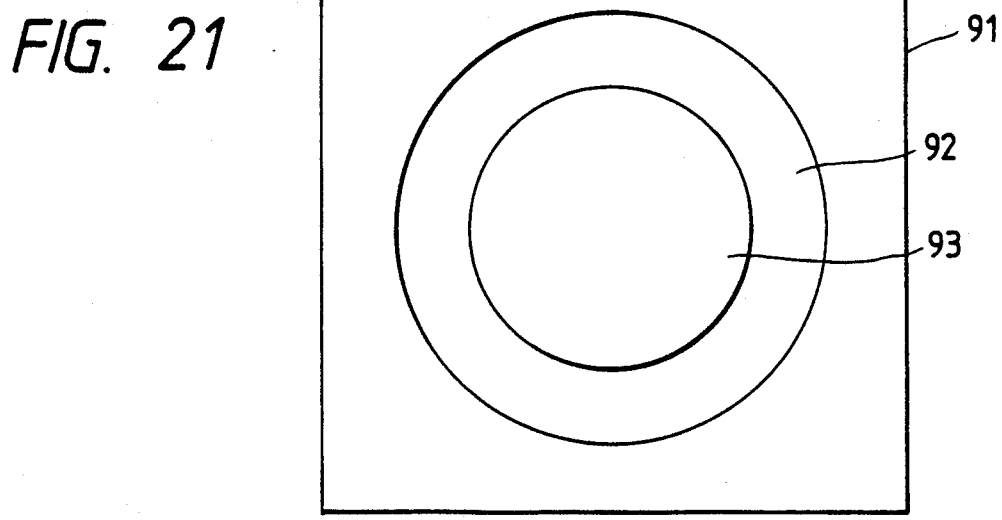
FIG. 21 is a front view of the key member.
Figure 22A:
FIGS. 22(a) through 22(g) show a sequence of process steps to manufacture an embodiment of the present invention.
Figure 22B:
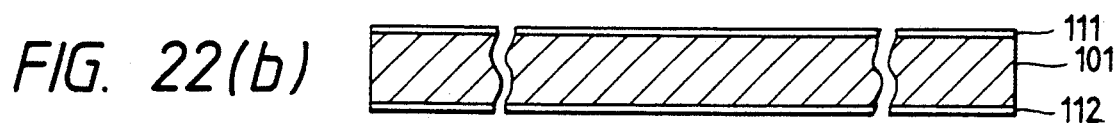
Figure 22C:
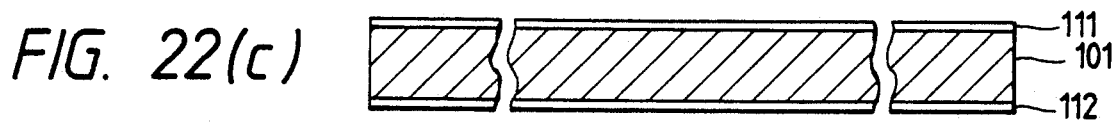
Figure 22D:
Figure 22E:
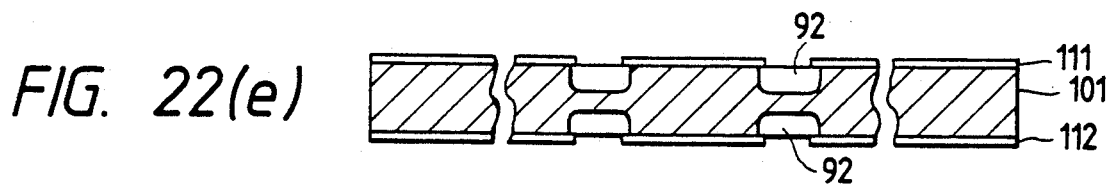
Figure 22F:
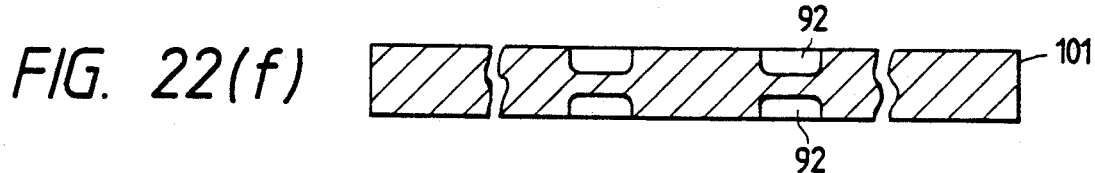
Figure 22G:

FIGS. 20 and 21 show a diaphragm chip used in a sixth embodiment. FIG. 20 shows a cross sectional view of the chip, and FIG. 21, a plan view of it. In FIG. 20, reference numeral 91 designates a diaphragm chip of silicon, and numeral 92 ring-like grooves which are formed in both sides of the chip and symmetrically arranged. Portions other than the grooves 92 indicate a ring-like flexible portion. Reference numeral 93 designates a displacement portion which is combined with the fixed electrode to form a capacitor. This portion when receiving a pressure displaces in a translational manner. Reference numeral 94 designates a bonding portion to be bonded to the support (not shown) by the glass bonding. The chip 91 has the size of 9 mm × 9 mm, and an original chip is used selected from those chips of 0.2 mm to 3 mm thick in accordance with the range used. The size of the groove 92: the inner diameter is 4.2 mm, outer diameter is 7.0 mm, and the thickness is selected from 30 um to 1.5 mm in accordance with the range used.

A sequence of process steps to manufacture the diaphragm will be described in brief with reference to FIGS. 22(a) through 22(g). A silicon wafer 101 of a necessary thickness and a sheet resistance is first prepared (FIG. 22(a)). Protecting films 111 and 112, which are used in the stage of etching process, are applied on both sides of the silicon wafer by vapor deposition process or coating process (FIG. 22(b)). The portions of the protecting films where grooves are to be formed are removed by the photo-etching process or the machine work (FIG. 22(c)). In case where the machine work is used, the structure is cut away up to a necessary depth (FIG. 22(d)). Then, the structure is etched till it has a necessary thickness, by wet etching or dry etching (FIG. 22(e)). Then, the protecting films are removed (FIG. 11(f)), and the structure is cut to complete a diaphragm chip 91 (FIG. 22(g)).

Figure 23:
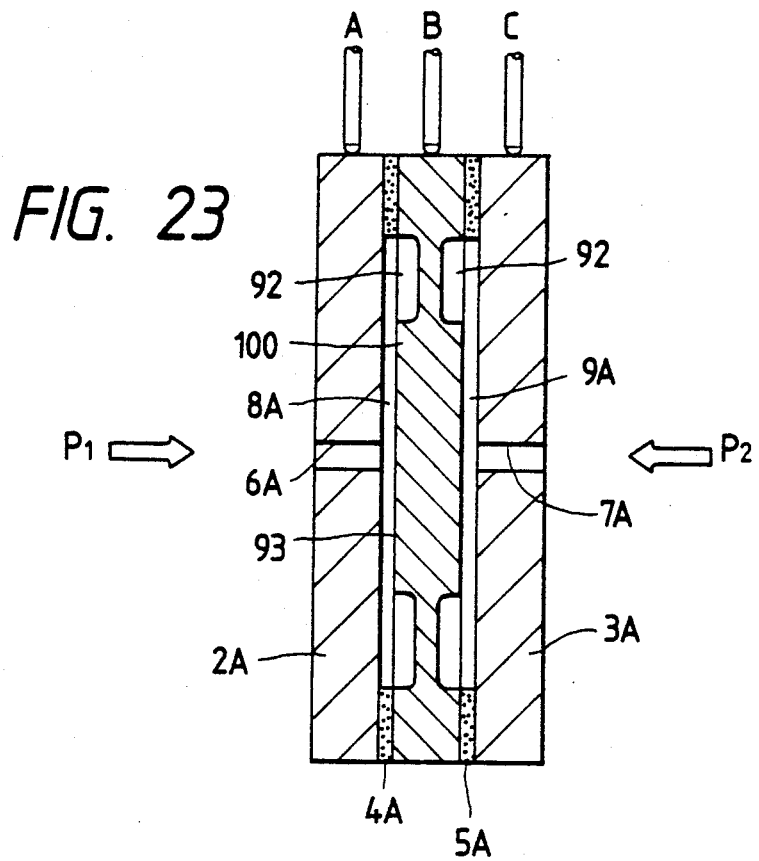
FIG. 23 is a cross sectional view of a sixth embodiment of the present invention.
Figure 25:
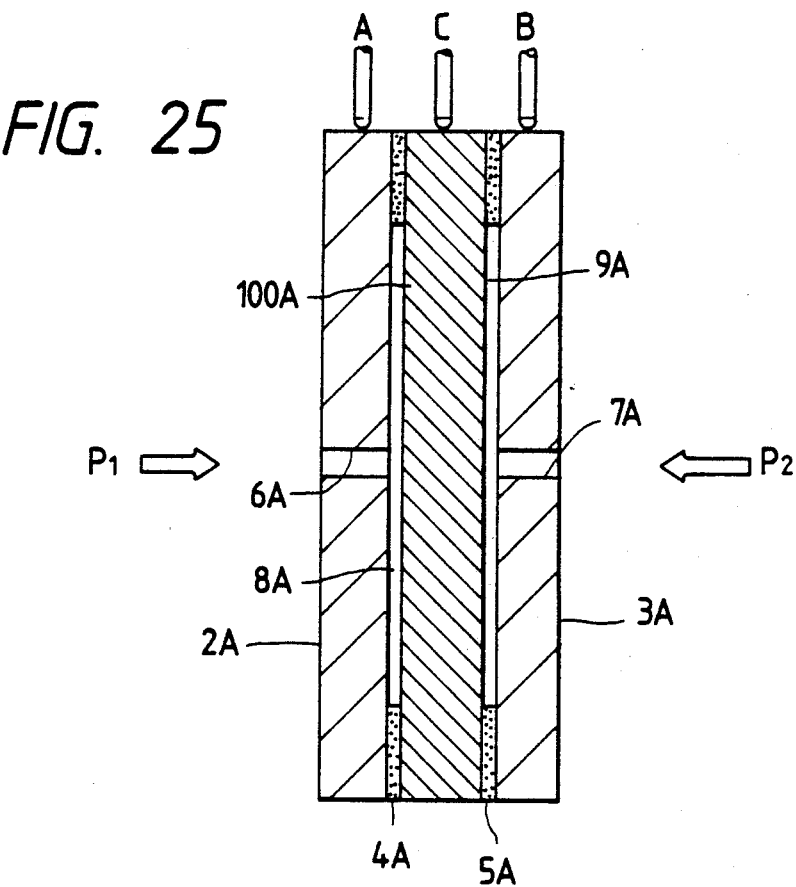
FIG. 25 is a cross sectional view of another prior art pressure detecting apparatus.

FIG. 23 shows a cross sectional view of an embodiment of a capacitive differential pressure detector using a diaphragm thus formed. In the figure, reference numeral 100 designates a diaphragm. The remaining portions are the same as those in FIG. 25.

In the instant embodiment, where the inner diameter of the groove 92 is 4.2 mm, the outer diameter is 7.0 mm, and a ratio of the thickness of the diaphragm 100 and the thickness of the diaphragm at each groove 92 is 3, a maximum stress at the inner peripheral edge of each of glass bonding portions 4A and 5A is approximately 1/9 that generated at each groove 92. An experiment conducted by the inventor showed that a minimum fracture strength of silicon of the end portion of each glass bonding portion 4A and 5A was approximately 10 kgf/mm$^2$, and a minimum fracture strength of the groove 92 was 100 kgf/mm$^2$. 100 kgf/mm$^2$ is approximately equal to the peculiar figure of the silicon. Accordingly, it is seen that the fracture strength of each glass bonding portion 4A and 5A is reduced to be approximately 10% of the peculiar fracture strength of silicon. It may be considered that the reduction of fracture strength is due to damage on the silicon wafer surface in the previous process step or the concentration of stress when the glass bonding is made.

As described above, when the thickness ratio is 3, a ratio of the maximum stress of the end portion of each glass bonding portion 4A and 5A, and each groove 92, and the fracture strength of them is well balanced. Therefore, the mechanical strength of silicon may be effectively utilized. If the thickness ratio is further increased, the glass bonding portions 4A and 5A will never be mechanically fractured. In this case, accordingly, it is only needed that attention is applied to only the strength of the grooves 92.

Where the width of the grooves 92 is 1.4 mm and the thickness ratio is 3 as in this embodiment, the motion of the central portion or the displacing portion of the diaphragm 100, which is disposed facing the fixed electrodes 2A and 3A, to form capacitances, is substantially translational. More specifically, when the diaphragm 100 displaces upon receipt of pressure, a camber of the displacing portion is 10% or less a displacement of the groove 92 due to the displacement of the diaphragm 100. Accordingly, the motion of the displacing portion resembles the translation. The wider the width of the groove 92 is and the larger the thickness ratio is, the greater this effect is.

The displacing portion is limited by the groove 92. If the groove 92 is formed by a precise method, such as etching, an area of the displacing portion can be precisely configured. Accordingly, the capacitors formed on the basis of each precisely configured displacing portions are uniform in their capacitance, improving accuracy of the differential pressure detector.

Since a precise method, such as photo-etching, can be employed for forming the grooves 92, grooves 92 are excellent in shape, size, axial alignment, symmetry of both sides of the diaphragm, and the like. Accordingly, the positioning accuracy of the diaphragm supports, which was inevitably poor in the planar diaphragm, is remarkably improved, and this facilitates the improvement of the measuring accuracy of the detector.

Consider a case that a 9-mm square chip is used for the detector as in the above embodiment. In a low pressure or differential pressure range of 4.0 m $H_2O$ or less, the thickness of the diaphragm, if it is a planar diaphragm, is 100 um or less. The diaphragm of such a thickness is difficult in working and handling as well. On the other hand, if the diaphragm of the instant embodiment is used, the thickness of the diaphragm is at least 200 um, which is easy to handle. This feature greatly contributes to the size reduction of the detector.

In the above embodiment, the bottom surface of each groove 92 is planar. It is evident, however, that any other shape may be taken if this portion is at least partially thin.

Figure 24:
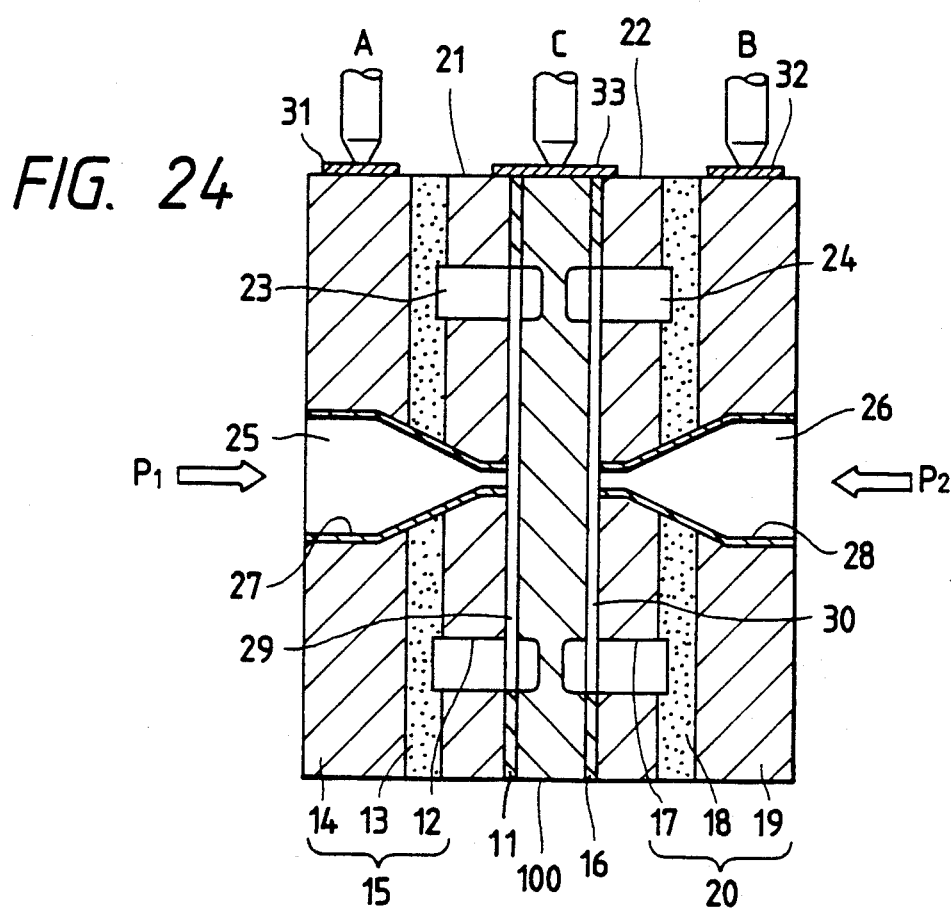
FIG. 24 is a cross sectional view of an aspect of the sixth embodiment according to the present invention.

FIG. 24 shows a cross sectional view of another embodiment of a capacitive differential detector using such a diaphragm. This embodiment improves the linearity of the detect signal that is produced by the previous embodiment. A key position of the structure of the instant embodiment will described. A diaphragm 100 and a pair of fixed electrodes 15 and 20 are used as in the previous embodiment. One side of the diaphragm 100 faces a conductive plate 12 of the fixed electrode 15, with a gap 29 that interposes therebetween. The other side of the diaphragm 100 faces a conductive plate 17 of the fixed electrode 20, with a gap 3 that interposes therebetween. A support 21, which is bonded to an insulating plate 13 and surrounds the conductive plate 12 is bonded to one side of the diaphragm 100. A support 22, which is bonded to an insulating plate 18 and surrounds the conductive plate 17, is bonded to the other side of the diaphragm 100. Reference numerals 25 and 26 designate holes for guiding pressures P1 and P2 to the diaphragm. The inner surfaces of the pressure guide holes are covered with conductive films 17 and 28, respectively. These conductive films electrically connect the conductive plates 12 and 17 to the conductive plates 14 and 19, respectively.

Figure 26:
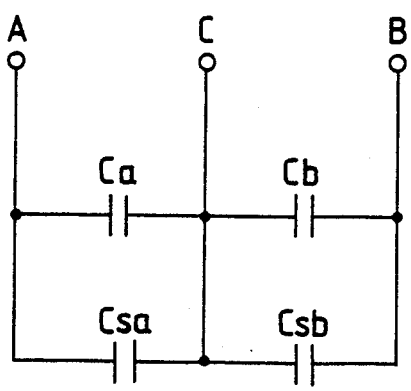
FIG. 26 shows an equivalent circuit concerning the capacitors in FIG. 25.

The instant embodiment using this diaphragm 100 is advantageous in that since the supports 21 and 22 are electrically isolated from the fixed electrodes 15 and 20, the capacitances Csa and Csb in the equivalent circuit of FIG. 26 are remarkably reduced, greatly improving the measuring accuracy. The remaining portions of the instant embodiment are the same as those in the previous embodiment.

The first and second embodiment are superior to the prior art detector in the following points.

(1) The linearity of the detect signal is good. The reproducibility of measuring accuracy is excellent. In other words, the measured values are uniform.

(2) When an excessive pressure is applied, if the diaphragm comes in contact with the fixed electrodes, the diaphragm will never be damaged.

(3) In connection with item (1), a production yield of the detectors is high, and hence a stable supply of the detector products is possible.

In the third embodiment, if one side of the diaphragm is partially pressed against the surface of the fixed electrode by an excessive differential pressure, a pressure introduced into the electrode acts on the diaphragm surface through the grooves intersecting the pressure guide hole. The introduced pressure action on the diaphragm surface facilities the return action or response of the diaphragm displacement when an excessive differential pressure is removed. The means to effect it is easy, and hence may readily be realized technically.

In the fourth embodiment, the substrate is displaced in accordance with a differential pressure applied to both sides of the substrate. The pressures applied to the sides are equal to each other. Therefore, the fixed electrodes will not be displaced due to the differential pressure. With such an arrangement, the capacitances of the capacitors formed by the diaphragm and the fixed electrodes vary in an exact differential manner. The pressure detector of the third embodiment of the present invention may be manufactured easily.

According to the fourth embodiment, the linearity of the detect signal with respect to the differential pressure is good even if the differential pressure is large. Further, the structure of it is simple. Therefore it is inexpensive and easy to manufacture.

In the fifth embodiment, the diaphragm, the first and second conductive plates of the fixed electrodes disposed on both sides of the diaphragm, and the insulating plates interposed therebetween are made of materials of equal or near equal thermal expansion coefficients. Accordingly, no radial stress develops in the diaphragm when the ambient temperature varies. Accordingly, no displacement occurs due to this stress. Therefore, the span characteristic and the linearity of the differential signal are kept good.

According to the fifth embodiment, the influence by the ambient temperature upon the span characteristic and the linearity may be minimized. In this respect, the temperature characteristic of the detector is improved.

The sixth embodiment is advantageous over the prior art in the following points.

(1) The stress to be generated in the diaphragm is reduced, lessening the possibility of mechanical destruction.

(2) Accurate and uniform measured values are obtained.

(3) Handling and assembling of the diaphragm are easy.

(4) Reduction of size and weight of the detector are realized.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A capacitive differential pressure detector comprising:
   a diaphragm having opposite radially extending surfaces; and
   a pair of fixed electrodes, each including:
   at least one plate having a radially extending surface opposing a radially extending surface of the diaphragm, each of said at least one plate having a centrally disposed pressure guide hole communicating at the inner end edge with the diaphragm, an annular support, disposed between and bonding the opposing radially extending surfaces of the plate and the diaphragm adjacent an outer peripheral portion of the at least one plate, one of said opposing radially extending surfaces of said at least one plate having a first annular recessed portion formed therein defining an annulus radially spaced from and surrounding a central portion of said one radially extending surface, said annulus having a first depth and spaced inner and outer edges defining a first width, a second annular recessed portion between said inner and outer edges having a second width less than the first width and a second depth extending from said first depth.

2. The capacitive differential pressure detector of claim 1 wherein each of said fixed electrodes comprises:

a second plate having a radially extending surface and an outer peripheral surface;

an insulating plate having a radially extending surface, disposed between and bonded to the radially extending surface of said at least one plate and said a second plate.

3. The capacitive differential pressure detector of claim 2 wherein said first and second plates are composed of electrically conductive material.

4. The capacitive differential pressure detector of claim 2 wherein the first and second plates and the insulating plate have substantially the same coefficients of thermal expansion.

5. The capacitive differential pressure detector of claim 1 wherein said recessed portion is formed on the opposing radially extending surface of said at least one plate and comprises at least one radially extending groove intersecting said inner end edge of the pressure guide hole.

6. The capacitive differential pressure detector of claim 5 wherein the said at least one groove is a plurality of grooves intersecting said edge of the pressure guide hole and each other.

7. The capacitive differential pressure detector of claim 1, wherein said at least one plate and said annular support is made of insulating material electrically insulating the plate from said diaphragm, and wherein said recessed portion includes an annular recess in the opposing surface of said at least one plate surrounding said inner edge of the pressure guide hole and an annular groove formed in the said opposing surface of said at least one plate radially spaced from the annular recess, said annular groove and recess defining an annular center portion of said at least one plate, and wherein said fixed electrode further comprises a conductive film formed on said annular center portion of said at least one plate.

8. The capacitive differential pressure detector of claim 1, wherein the recessed portion comprises an annular groove in opposite radially extending surfaces of the diaphragm, said groove defining a central flexible portion.

9. A capacitive differential pressure detector comprising:

a diaphragm having opposite side surfaces;

fixed electrodes disposed adjacent each of said opposite side surfaces of said diaphragm, each of said fixed electrodes including:

a first plate adjacent a central portion of one of said opposite side surfaces of said diaphragm;

an annular support bonded to a peripheral edge portion of said diaphragm and disposed separated from and around a peripheral end face of said first plate;

an insulating plate bonded over a surface of said annular support and a surface of said first plate opposite a surface facing said diaphragm;

a second plate bonded to said insulating plate on a surface opposite said first plate, said second plate electrically connected to said first plate; and wherein a pressure guide hole passes through the central portions of said first and second plates and said insulating plate, and an edge portion of the opening of said pressure guide hole close to said diaphragm, an outer peripheral edge portion of said first plate closer to said diaphragm, and an inner peripheral edge portion of said support closer to said diaphragm are all formed to be stepped portions.

10. The capacitive differential pressure detector of claim 9 wherein said first and second plates are conductive.

11. A capacitive differential pressure detector comprising:

a diaphragm having opposite side surfaces;

fixed electrodes disposed adjacent each of said opposite side surfaces of said diaphragm, each of said fixed electrodes including:

a pressure guide hole passing through the central portion thereof;

a stepped portion formed in an edge portion of an opening of said pressure guide hole closer to said diaphragm;

an annular center planar portion made of insulating material positioned radially outside and contiguous to said stepped portion and disposed in parallel with and close to the surface of said diaphragm;

an annular groove radially outside and contiguous to said center planar portion;

a conductive film formed on at least said center planar portion and serving also as a capacitor lead terminal; and an annular support, made of insulating material, bonded to but electrically insulated from said diaphragm at a peripheral portion radially outside said annular groove.

12. A capacitive differential pressure detector comprising:

a diaphragm having opposite side surfaces;

fixed electrodes disposed adjacent each of said opposite side surfaces of said diaphragm, each of said fixed electrodes including:

a pressure guide hole passing through the central portion thereof;

wherein each of said fixed electrodes has at least one groove formed on a surface closer to said diaphragm, said at least one groove intersects said pressure guide hole.

13. The capacitive differential pressure detector of claim 12 wherein a plurality of grooves are formed on a surface of each of said fixed electrodes closer to said diaphragm, each of said grooves intersects said pressure guide hole.

14. A capacitive differential pressure detector for measuring a pressure on the basis of capacitances comprising:

a diaphragm having opposite side surfaces;

fixed electrodes disposed adjacent each of said opposite side surfaces of said diaphragm, each of said fixed electrodes comprising:

a first plate adjacent a central portion of one of said opposite side surfaces of said diaphragm, said first plate having a thermal expansion coefficient substantially equal to that of said diaphragm;

an annular support bonded to a peripheral edge portion of said diaphragm and disposed separated from and around a peripheral end face of said first plate;

an insulating plate bonded over a surface of said annular support and a surface of said first plate opposite a surface facing said diaphragm, said insulating plate having a thermal expansion coefficient substantially equal to that of said first conductive plate; an a second plate bonded to said insulating plate on a surface opposite said first plate, said second plate electrically connected to said first plate.

15. A capacitive differential pressure detector for measuring a pressure on the basis of capacitances of capacitors formed between a diaphragm displaced in response to said pressure and each of first and second fixed electrodes with pressure guide holes disposed on both sides of said diaphragm, wherein said diaphragm includes a part located in the central portion thereof, said part mainly displacing in response to said pressure, a bonding part located in the peripheral edge portion thereof, said bonding part bonded to and electrically insulated from each said fixed electrode, and an annular flexible part whose width is ½ to 1/5 of the diameter of said displacing part and thickness is ½ or less of that of said displacing part, said flexible part coupling said displacing part with said bonding part.

16. The capacitive differential pressure detector of claim 15 further comprising annular grooves formed in each of said fixed electrodes, said annular grooves are formed in correspondence with said flexible part.

17. A capacitive differential pressure detector comprising:

a diaphragm having a radially extending surface;

a fixed electrode including:

at least one plate having first and second radially extending surfaces, said first radially extending surface of said at least one plate opposing and spaced from said radially extending surface of said diaphragm, and having a centrally disposed pressure guide hole for applying a pressure to said radially extending surface of said diaphragm and to said first radially extending surface of said at least one plate; and a substrate having a first surface spaced from and opposing said second radially extending surface of said at least one plate, and having a pressure guide hole disposed in communication with said pressure guide hole of said electrode for applying said pressured to said radially extending surface of said diaphragm and to both said first surface of substrate and said second radially extending surface of said at least one plate.

* * * * *